(12) United States Patent
Ichikawa et al.

(10) Patent No.: US 10,266,288 B2
(45) Date of Patent: Apr. 23, 2019

(54) FORM-FILL-SEAL MACHINE

(71) Applicant: ISHIDA CO., LTD., Kyoto-shi, Kyoto (JP)

(72) Inventors: Makoto Ichikawa, Ritto (JP); Ryoichi Sato, Ritto (JP); Ryota Nagashima, Ritto (JP); Shinji Koike, Ritto (JP); Ryo Sasaki, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 15/775,006

(22) PCT Filed: Oct. 3, 2016

(86) PCT No.: PCT/JP2016/079337
§ 371 (c)(1),
(2) Date: May 10, 2018

(87) PCT Pub. No.: WO2017/086038
PCT Pub. Date: May 26, 2017

(65) Prior Publication Data
US 2018/0346159 A1 Dec. 6, 2018

(30) Foreign Application Priority Data

Nov. 17, 2015 (JP) .................................. 2015-224886

(51) Int. Cl.
*G06F 7/00* (2006.01)
*B65B 9/213* (2012.01)
(Continued)

(52) U.S. Cl.
CPC .............. *B65B 9/213* (2013.01); *B29C 65/02* (2013.01); *B29C 65/74* (2013.01);
(Continued)

(58) Field of Classification Search
None
See application file for complete search history.

(56) References Cited

U.S. PATENT DOCUMENTS

| | | | | |
|---|---|---|---|---|
| 5,753,067 A | * | 5/1998 | Fukuda | ................. B65B 9/2028 156/358 |
| 2011/0107729 A1 | * | 5/2011 | Miyazaki | ................ B29C 65/18 53/562 |

FOREIGN PATENT DOCUMENTS

| | | |
|---|---|---|
| EP | 0380868 A2 | 8/1990 |
| EP | 0915015 A1 | 5/1999 |

(Continued)

OTHER PUBLICATIONS

Search Report from the corresponding European Patent Application No. 16866040.5 dated Oct. 9, 2018.
(Continued)

*Primary Examiner* — Yolanda R Cumbess
(74) *Attorney, Agent, or Firm* — Shinjyu Global IP

(57) ABSTRACT

Certain implementations provide a form-fill-seal machine that can efficiently seal a packaging material. The transverse sealing unit may have first members to sandwich the packaging material and sealing the packaging material in a transverse direction, and second members for squeezing the packaging material while sandwiching the packaging material with a prescribed gap left therebetween. The control unit may cause the packaging material to be squeezed by the second members by causing the transverse sealing unit located at a reference position to descend faster than the packaging material being conveyed downward. The control unit may cause the transverse sealing unit to ascend while the packaging material is being sealed by the first members. The control unit may cause the transverse sealing unit to move such that the first members are separated from the packaging material.

6 Claims, 19 Drawing Sheets

(51) Int. Cl.
   *B65B 51/10* (2006.01)
   *B65B 51/26* (2006.01)
   *B29C 65/74* (2006.01)
   *B29C 65/78* (2006.01)
   *B29C 65/00* (2006.01)
   *B29C 65/02* (2006.01)
   *B65B 51/30* (2006.01)
   *B65B 9/20* (2012.01)
   *B65B 41/12* (2006.01)
   *B65B 61/06* (2006.01)
   *B29L 31/00* (2006.01)

(52) U.S. Cl.
   CPC ...... *B29C 65/7891* (2013.01); *B29C 66/1122* (2013.01); *B29C 66/4312* (2013.01); *B29C 66/4322* (2013.01); *B29C 66/81422* (2013.01); *B29C 66/8225* (2013.01); *B29C 66/8246* (2013.01); *B29C 66/83543* (2013.01); *B29C 66/849* (2013.01); *B29C 66/8491* (2013.01); *B29C 66/93441* (2013.01); *B65B 9/2007* (2013.01); *B65B 41/12* (2013.01); *B65B 51/10* (2013.01); *B65B 51/26* (2013.01); *B65B 51/30* (2013.01); *B65B 61/06* (2013.01); *B29C 65/7451* (2013.01); *B29C 66/83421* (2013.01); *B29L 2031/7128* (2013.01)

(56) References Cited

FOREIGN PATENT DOCUMENTS

| | | |
|---|---|---|
| JP | H05-065144 A | 3/1993 |
| JP | H08-230807 A | 9/1996 |
| JP | 2001-180621 A | 7/2001 |
| JP | 2007-076719 A | 3/2007 |
| WO | 2004/011334 A1 | 2/2004 |

OTHER PUBLICATIONS

Search Report from the corresponding International Patent Application No. PCT/JP2016/079337 dated Dec. 13, 2016.
Preliminary Report on Patentability (with Written Opinion) from the corresponding International Patent Application No. PCT/JP2016/079337 dated May 22, 2018.
Third Party Observation from the corresponding International Patent Application No. PCT/JP2016/079337 submitted on Mar. 16, 2018.

* cited by examiner

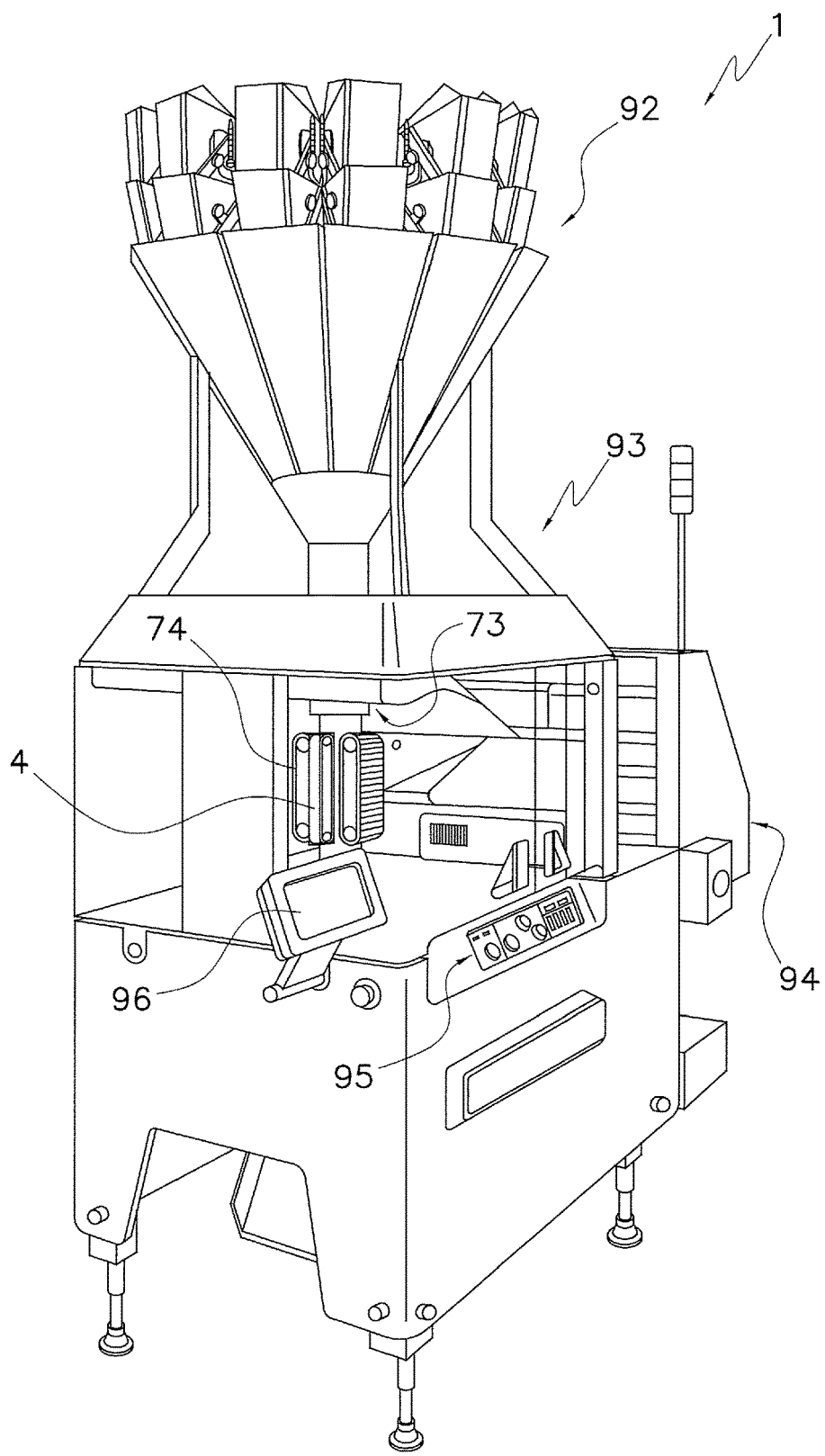
F I G. 1

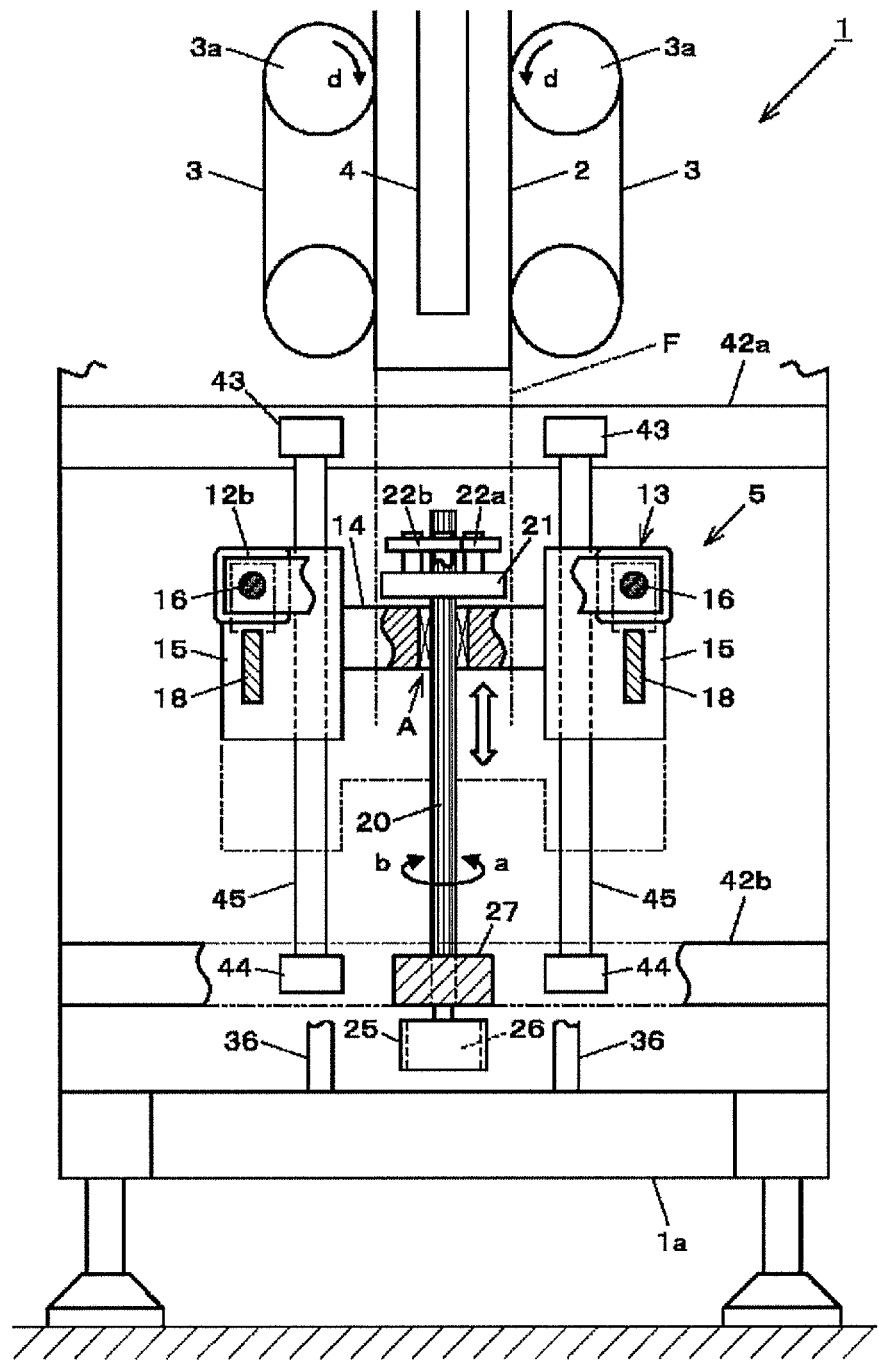
F I G. 5

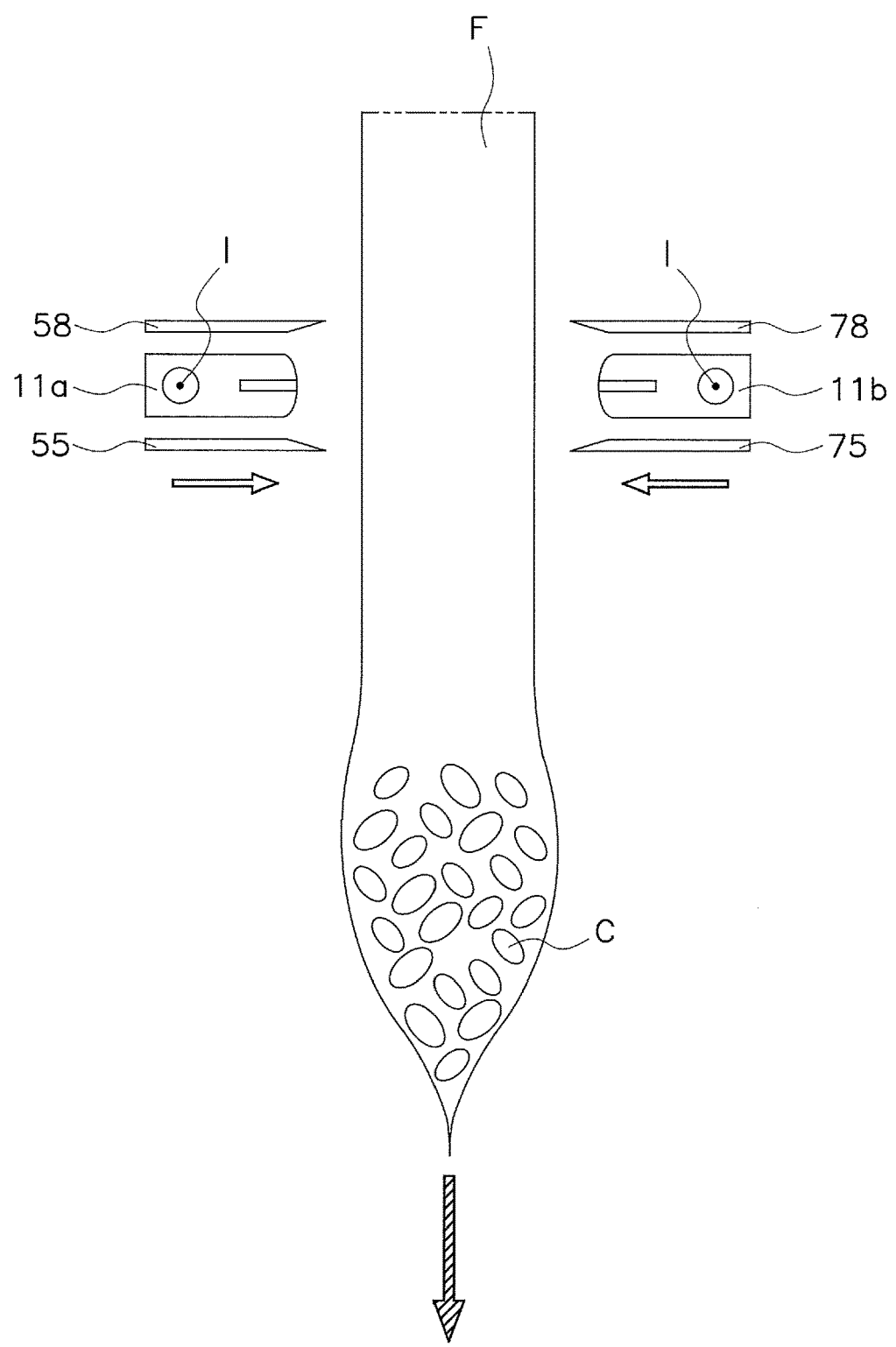
F I G. 10

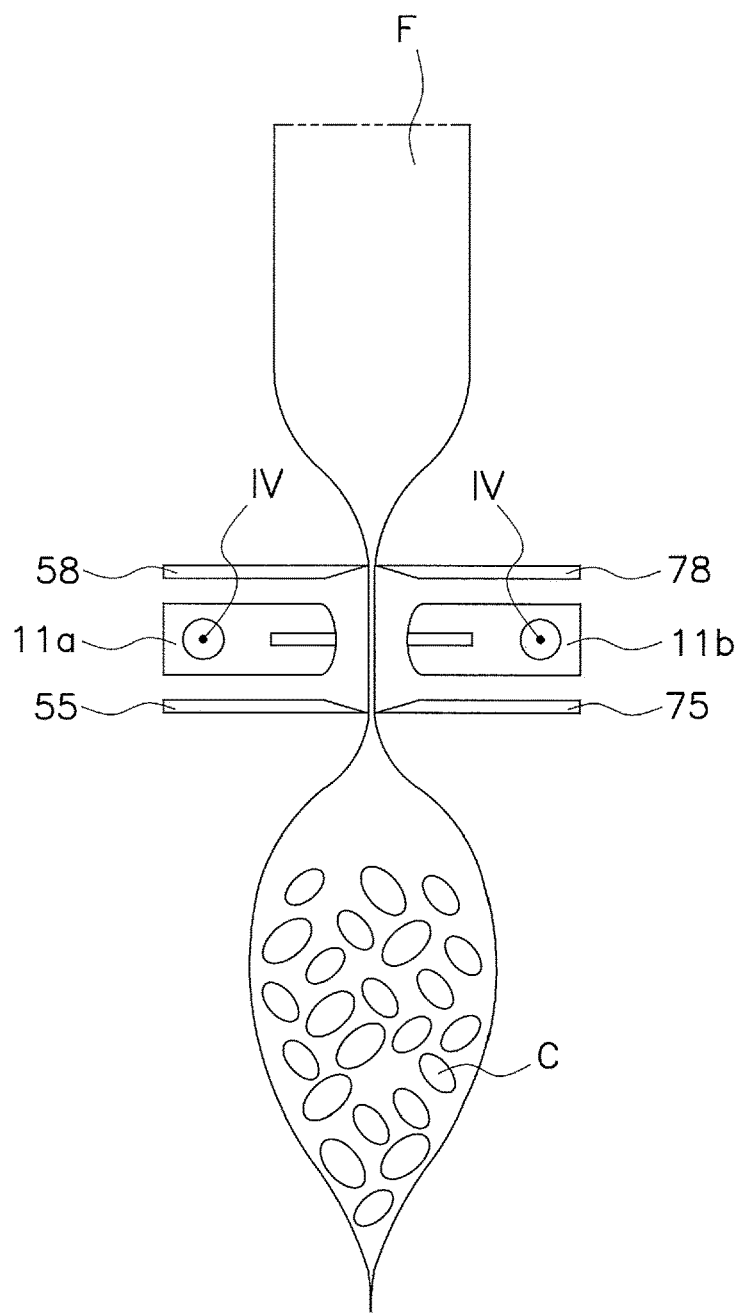
F I G. 1 3

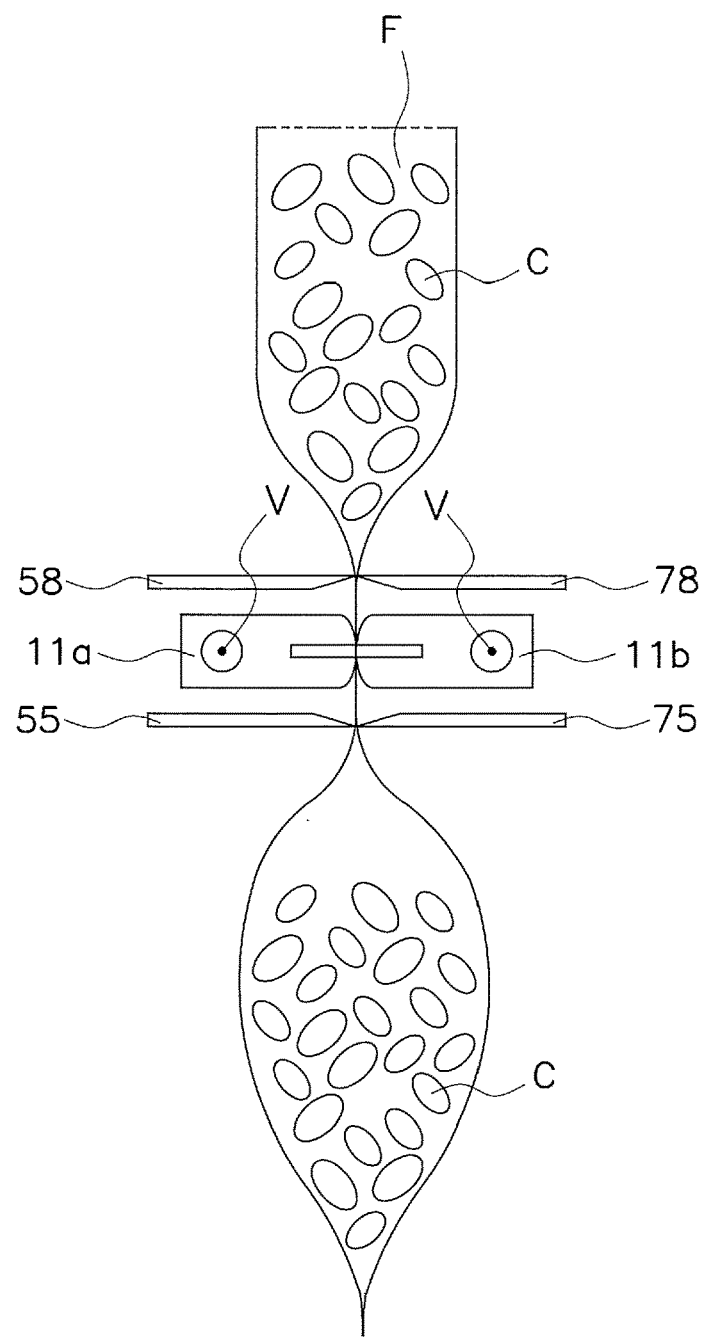
F I G. 1 4

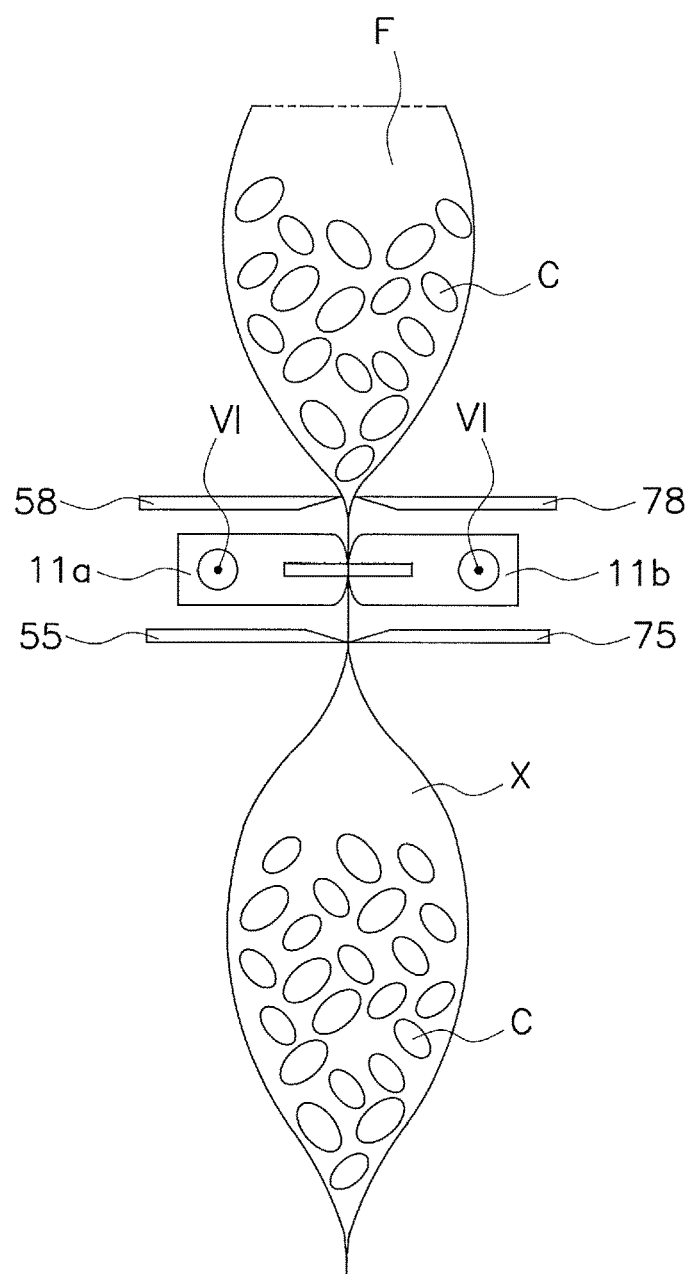
F I G. 1 5

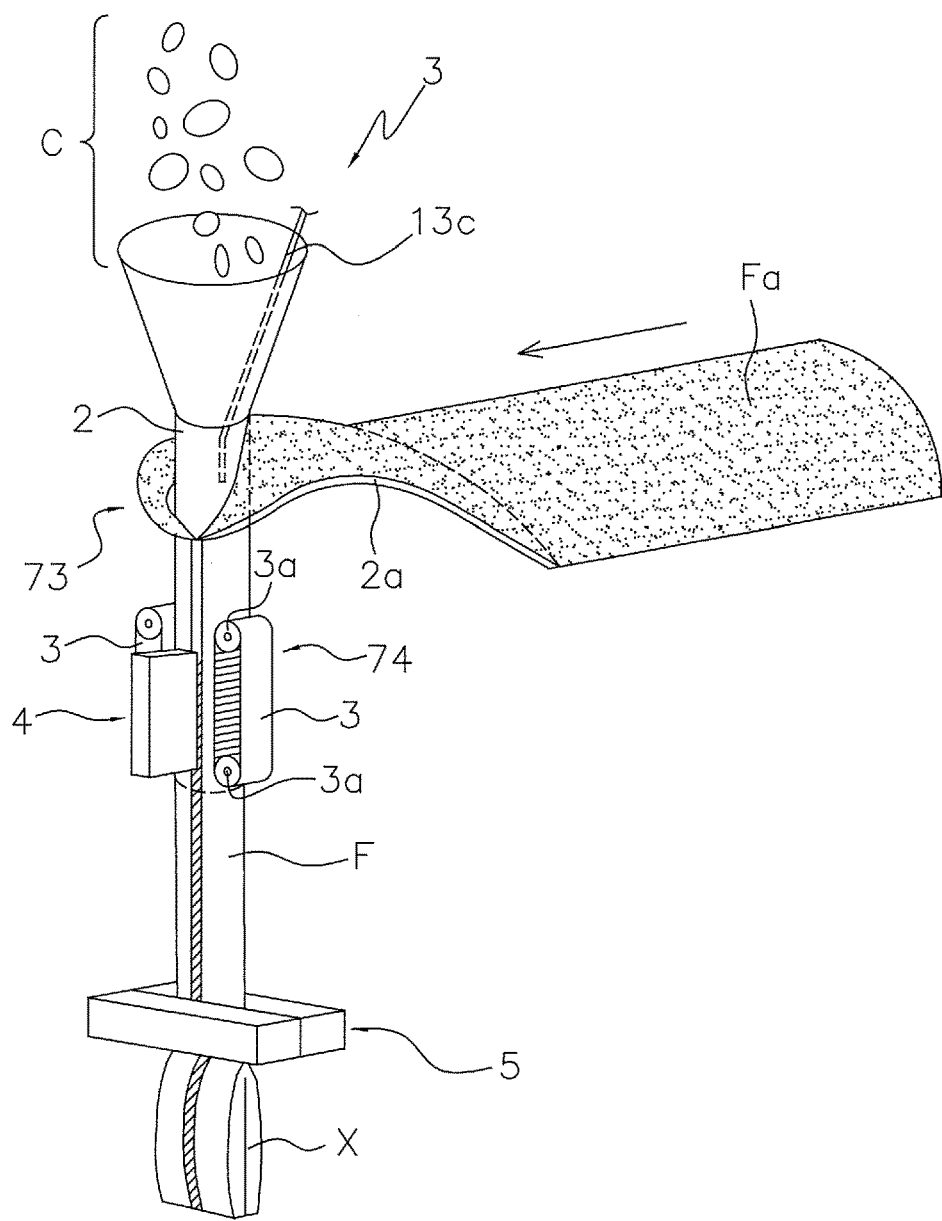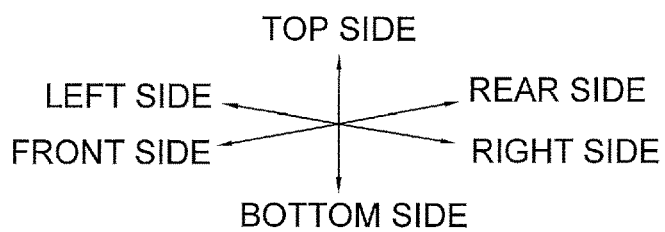
FIG. 18

FORM-FILL-SEAL MACHINE

PRIORITY

This application is a U.S. National stage application of International Application PCT/JP2016/079337, with an international filing date of Oct. 3, 2016, which claims priority to Japanese Patent Application No. 2015-224886 filed on Nov. 17, 2015. The entire disclosures of International Application PCT/JP2016/079337 and Japanese Patent Application No. 2015-224886 are hereby incorporated herein by reference.

TECHNICAL FIELD

Certain implementations of the present invention relate to a form-fill-seal machine to fill bags with package contents while sealing a tube-shaped packaging material to form the bags.

BACKGROUND

Vertical pillow form-fill-seal machines have been used in the past as form-fill-seal machines in which, a bag that, while being formed, is filled with package contents such as food products, and hermetically sealed to package the contents. The form-fill-seal machine shapes a packaging material that is a film of sheet form into a cylindrical shape (tube shape) using a former and a tube, and seals the overlapping vertical edges of the tube-shaped packaging material with a longitudinal sealing mechanism. Next, the form-fill-seal machine seals the bottom part of the bag using a transverse sealing mechanism, and then fills the interior of the tube-shaped packaging material with package contents. Next, the form-fill-seal machine seals the top part of the bag using a transverse sealing mechanism, and then the transverse-sealed portions are cut across the center by a cutter. The form-fill-seal machine repeatedly and continuously carries out the aforementioned actions of forming bags and filling the bags with package contents.

SUMMARY

The bags hermetically sealed upon being filled with package contents are then boxed and shipped. However, when a large amount of gas is sealed within the bags, only a given number of bags can be accommodated within a box, whereas when a small amount of gas is sealed within the bags, the packages move around inside the box. For this reason, each time that the form-fill machine is operated, it has been necessary for the operator to control the amount of gas sealed within the bags, so as to adjust the thickness of the bags. An example discloses a form-fill-seal machine provided with a mechanism designed to avoid excess air from entering the sealed bags in order to adjust the thickness of the bags. However, in order to control the amount of gas that is sealed inside the bags, a step of blowing an appropriate amount of gas into a bag after the bottom part of the bag has been sealed by the transverse sealing mechanism is necessary. Therefore, in order to reduce the time that it takes to perform this series of actions of filling the bags with package contents, and hermetically sealing the bags to package the contents, there has been a demand for a technique that enables the packaging material to be efficiently sealed using a transverse sealing mechanism.

An object of certain implementations of the present invention is to provide a form-fill-seal machine that can efficiently seal packaging material.

The form-fill-seal machine of certain implementations of the present invention fills bags with package contents while sealing a tube-shaped packaging material to form the bags. This form-fill-seal machine is provided with a conveyance unit, a transverse sealing unit, and a control unit. The conveyance unit conveys packaging material downward. The transverse sealing unit has first members and second members. The first members sandwich the packaging material, and seal the packaging material in a transverse direction. The second members squeeze the packaging material while sandwiching the packaging material with a prescribed gap left therebetween. The control unit controls the position of the transverse sealing unit. The control unit carries out a first control step, a second control step, and a third control step. In the first control step, the control unit causes the packaging material to be squeezed by the second members by causing the transverse sealing unit located at a reference position to descend faster than the packaging material being conveyed downward by the conveyance unit. In the second control step after the first control step, the control unit causes the transverse sealing unit to ascend while the packaging material is being sealed by the first members. In the third control step after the second step, the control unit causes the transverse sealing unit to move such that the first members are separated from the packaging material, and then returns the transverse sealing unit to the reference position.

The form-fill-seal machine causes the transverse sealing unit to ascend while the packaging material is being sealed by the transverse sealing unit. Through this, the time from the moment that the transverse sealing unit descends from the reference position and begins to squeeze the packaging material until the packaging material is sealed while the transverse sealing unit ascends and the transverse sealing unit returns to the reference position is reduced, and therefore the transverse sealing action can be efficiently performed. Accordingly, the form-fill-seal machine can efficiently seal the packaging material.

Moreover, in the second control step, the control unit preferably causes gas to be blown into the bag from the moment that the transverse sealing unit begins to ascend until ascending of the transverse sealing unit is completed.

While the packaging material is being sealed by the transverse sealing unit, this form-fill-seal machine can inflate the bags by causing the transverse sealing unit to ascend. In addition, while the transverse sealing unit is ascending, this form-fill-seal machine blows gas into the bags, and can control the amount of gas that is sealed inside the bags. Accordingly, this form-fill-seal machine controls the amount of gas that is sealed inside the bags, and can appropriately adjust the bag thickness.

In the third control step, the control unit preferably causes gas to be blown into the bag from the moment that ascending of the transverse sealing unit is completed until the first members separate from the packaging material.

From the moment that ascending of the transverse sealing unit is completed until the transverse sealing unit separates from the packaging material, this form-fill-seal machine can blow gas into the bag, and control the amount of gas that is sealed inside the bag. Accordingly, this form-fill-seal machine can control the amount of gas that is sealed inside the bags, and appropriately adjust the bag thickness.

Preferably, the control unit also controls the position of the transverse sealing unit by switching between forward and reverse rotation of a motor for causing the transverse sealing unit to move.

This form-fill-seal machine can easily switch between descending and ascending of the transverse sealing unit by switching between forward and reverse rotation of the motor.

Preferably, in the second control step, the control unit causes the conveyance unit to stop conveying the packaging material while the first members are sealing the packaging material.

By stopping the conveying of the packaging material, this form-fill-seal machine can suppress problems while the packaging material is being sealed by the transverse sealing unit, such as problems that occur when printing a label onto the packaging material.

The form-fill-seal machine according to certain implementations of the present invention can efficiently seal packaging material.

BRIEF DESCRIPTION OF THE DRAWINGS

FIG. 1 is a perspective view of a form-fill-seal machine as an embodiment of the present invention;

FIG. 5 is a partial cutaway view along the line II-II of FIG. 3;

FIG. 10 is a view showing the state of the transverse sealing mechanism at point I of FIG. 9;

FIG. 13 is a view showing the state of the transverse sealing mechanism at point IV of FIG. 9;

FIG. 14 is a view showing the state of the transverse sealing mechanism at point V of FIG. 9;

FIG. 15 is a view showing the state of the transverse sealing mechanism at point VI of FIG. 9;

FIG. 18 is a perspective view showing a simplified configuration of a form-fill-seal unit in a Modification A;

DETAILED DESCRIPTION

Figure 2:
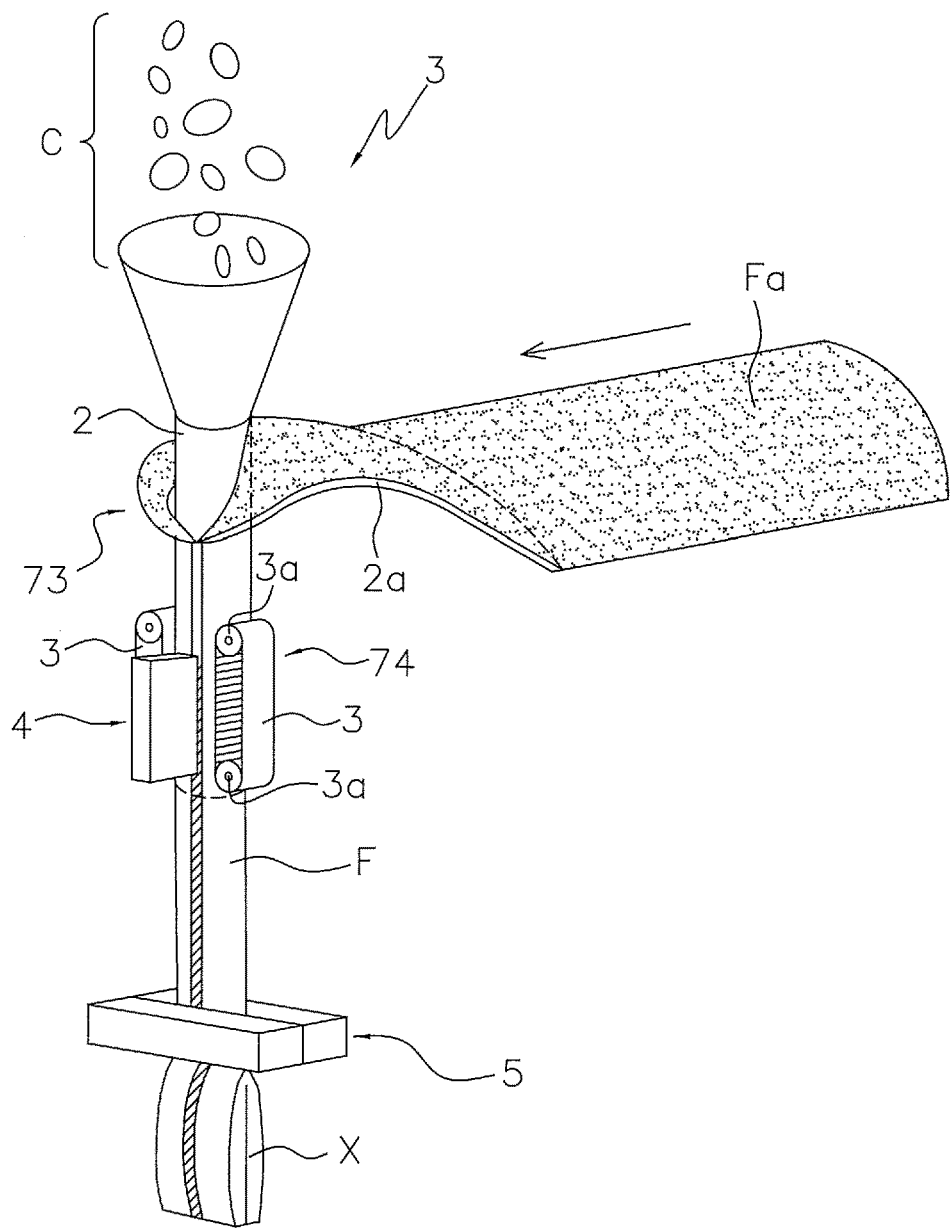
FIG. 2 is a perspective view showing a simplified configuration of a form-fill-seal unit.

Certain implementations of the present invention will be described while referring to the drawings. An embodiment described below is one specific example of the present invention, and is not intended to limit the technical scope of the present invention.

(1) Configuration of the Form-Fill-Seal Machine

FIG. 1 is a perspective view of a form-fill seal machine 1 according to one embodiment of the present invention. The form-fill-seal machine 1 is a machine for bagging a food product or other package contents. The form-fill-seal machine 1 is configured mainly from a combination weighing unit 92, a form-fill-seal unit 93, and a film supply unit 94.

The combination weighing unit 92 is arranged above the form-fill-seal unit 93. The combination weighing unit 92 weighs out the weight of the package contents into a plurality of weighing hoppers, and combines the weights measured in each of the weighing hoppers, to arrive at a prescribed total weight. The combination weighing unit 92 then downwardly discharges the package contents, in the prescribed combined total weight, to supply the package contents to the form-fill-seal unit 93.

At timing coincident with supply of the package contents from the combination weighing unit 92, the form-fill-seal unit 93 inserts the package contents into the bags, and seals the bags. The detailed configuration and action of the form-fill-seal unit 93 will be discussed below.

The film supply unit 94 is arranged adjacent to the form-fill-seal unit 93, and supplies packaging film to be shaped into bags to the form-fill-seal unit 93. A film roll onto which the film is wound is installed in the film supply unit 94. The film is reeled out from the film roll by the film supply unit 94.

The form-fill-seal machine 1 is provided with an operation switch 95 and a liquid crystal display 96. The operation switch 95 and the liquid crystal display 96 are mounted to the front surface of the body of the form-fill-seal machine 1. The liquid crystal display 96 is a touch panel display arranged at a location visible to the operator of the operation switch 95. The operation switch 95 and the liquid crystal display 96 function as input devices for receiving instructions for the form-fill-seal machine 1, and settings relating to the form-fill-seal machine 1. The liquid crystal display 96 also functions as an output device for displaying information relating to the form-fill-seal machine 1.

The form-fill-seal machine 1 is provided with a control unit (not illustrated). The control unit is a computer configured from a CPU, ROM, RAM, etc. The control unit is connected to the combination weighing unit 92, the form-fill-seal unit 93, the film supply unit 94, the operation switch 95, and the liquid crystal display 96. On the basis of input from the operation switch 95 and the liquid crystal display 96, the control unit controls the combination weighing unit 92, the form-fill-seal unit 93, and the film supply unit 94, and outputs information of various kinds to the liquid crystal display 96.

(2) Configuration of the Form-Fill-Seal Unit

FIG. 2 is a perspective view showing a simplified configuration of the form-fill-seal unit 93. In the description below, the six directions of "front (front surface)," "back (back surface)," "up," "down," "left," and "right are defined as shown in FIG. 2.

The form-fill-seal unit 93 is configured mainly from a shaping mechanism 73, a pull-down belt mechanism 74, a longitudinal sealing mechanism 4, and a transverse sealing mechanism 5. The shaping mechanism 73 shapes a sheet-shaped film Fa, conveyed thereto from the film supply unit 94, into a tube shape. The pull-down belt mechanism 74 conveys the tube-shaped film Fa downward. The longitudinal sealing mechanism 4 seals, in a longitudinal direction parallel to the conveying direction, portions where both edges of the tube-shaped film Fa overlap to form a cylindrically shaped film F. The transverse sealing mechanism 5 seals the cylindrically shaped film F, in a transverse direction orthogonal to the conveying direction, thereby forming bags X which are transversely sealed at the top end portion and the bottom end portion.

(2-1) Shaping Mechanism

The shaping mechanism 73 has a tube 2 and a former 2a. The tube 2 is a round cylindrical member open at the top end and bottom end. Package contents C supplied from the combination weighing unit 92 are charged into the opening of the top end of the tube 2. The former 2a is arranged so as to encircle the tube 2. When the film Fa reeled out from the film roll of the film supply unit 94 passes through a gap between the tube 2 and the former 2a, the film wraps about the tube 2 to shape a tube shape. The tube 2 and the former 2a can be swapped out according to the size of the bags X to be manufactured.

(2-2) Pull-Down Belt Mechanism

The pull-down belt mechanism 74 conveys downward the film Fa wrapped about the tube 2, while holding the film under suction. The pull-down belt mechanism 74 mainly has pulleys 3a, 3a and a pair of pull-down belts 3, 3. As shown in FIG. 2, the pair of pull-down belts 3, 3 is arranged to both the left and right sides of the tube 2 so as to sandwich the tube 2, and has a mechanism for holding under suction the tube-shaped film Fa. Through rotational driving of the pair of pull-down belts 3, 3 by the pulleys 3a, 3a, the pull-down belt mechanism 74 downwardly conveys the tube-shaped film Fa.

The pull-down belt mechanism 74 intermittently sends the film Fa. Namely, the pull-down belt mechanism 74 downwardly conveys the tube-shaped film Fa at intervals of amounts necessary to shape one bag X (one bag portion). More specifically, the pull-down belt mechanism 74 conveys one bag portion of the film Fa, and then stops the conveying of the film Fa for prescribed amount of time, and then once again conveys one bag portion of the film Fa, and repeats this series of actions. While conveying of the film Fa is stopped, the pull-down belt mechanism 74 prints a label or the like onto the film Fa.

(2-3) Longitudinal Sealing Mechanism

The longitudinal sealing mechanism 4 seals the tube-shaped film Fa in the longitudinal direction (the vertical direction in FIG. 2). The longitudinal sealing mechanism 4 is arranged on the front surface side of the tube 2. A drive mechanism (not illustrated) moves the longitudinal sealing mechanism 4 in the forward or backward direction so as to approach or move away from the tube 2.

By driving the longitudinal sealing mechanism 4 closer to the tube 2 using the drive mechanism, overlapping portions in the longitudinal direction of the film Fa wrapped about the tube 2 are sandwiched between the longitudinal sealing mechanism 4 and the tube 2. The longitudinal sealing mechanism 4 heats the overlapping portions of the film Fa while the overlapping portions are pressed against the tube 2 under fixed pressure by the drive mechanism, thereby sealing the overlapping portions of the film Fa in the longitudinal direction and forming a cylindrical film F. The longitudinal sealing mechanism 4 has a heater for heating the overlapping portions of the film Fa, a heater belt that contacts the overlapping portions of the film Fa, etc.

(2-4) Transverse Sealing Mechanism (2-4-1) Overall Configuration

Figure 3:
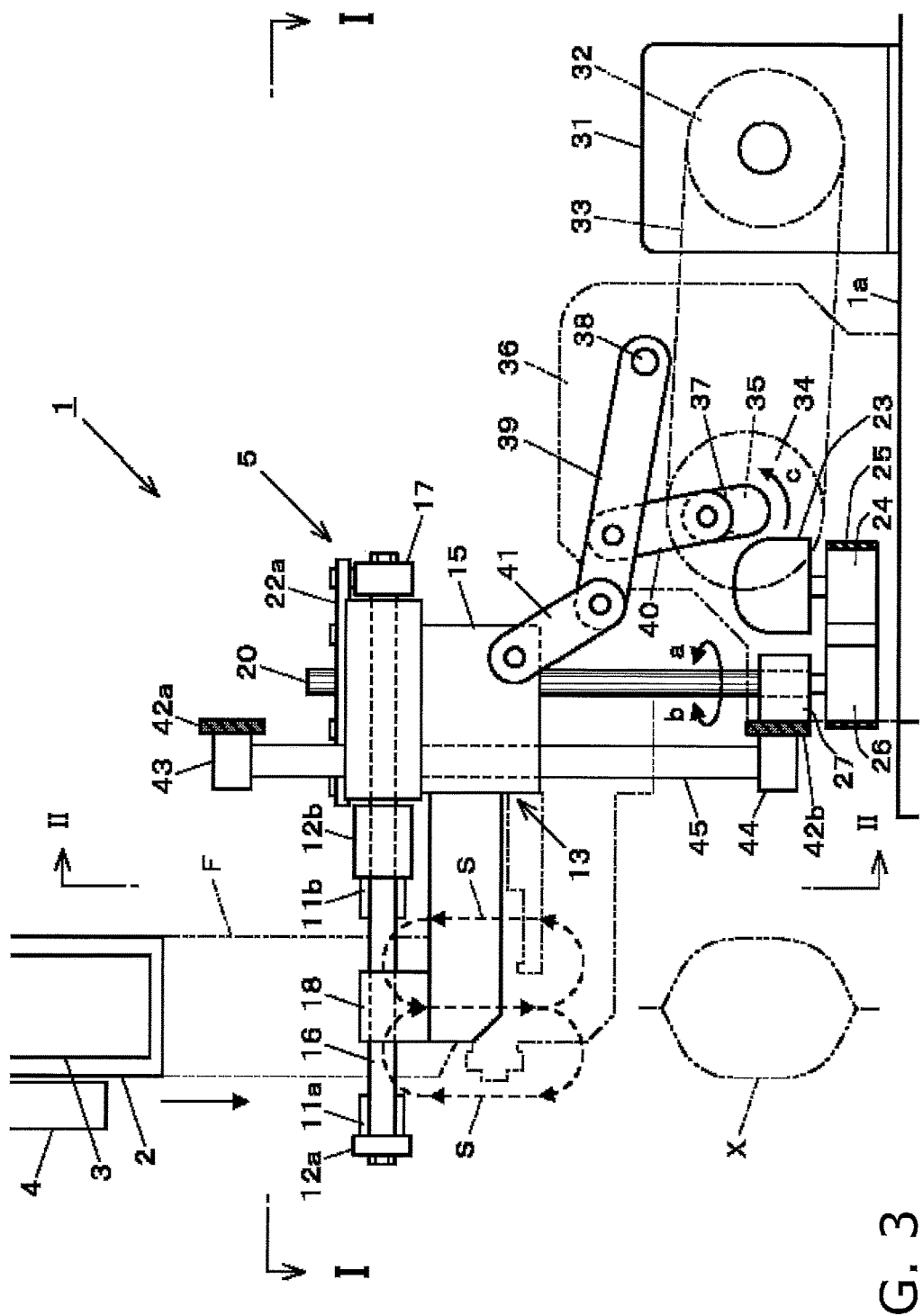
FIG. 3 is a side view showing a transverse sealing mechanism viewed from the right side.

FIG. 3 is a side view of the transverse sealing mechanism 5 as viewed from the right side. As the cylindrical film F is pulled downward by the traveling of one pair of pull-down belts 3,3 arranged at the right and left sides of the tube 2 (only the left side pull-down belt 3 is illustrated in FIG. 3), both side edges, which are overlapped, are longitudinally sealed by the longitudinal sealing mechanism 4 arranged at the front surface side of the tube 2, and the film F is transversely sealed in the width direction by the transverse sealing mechanism 5 arranged below the tube 2, thereby forming the bag X. During that time, the bag X is filled with an article (package contents C) charged from above the tube 2 between the two transverse seals. The bags X are cut and separated into individual bags using a cutter (not illustrated) built into the transverse sealing mechanism 5, and are transported further downstream in the production line.

With the form-fill-seal machine 1, a conveyance means for conveying the vertically-extended cylindrical film F in the longitudinal direction is configured by the pull-down belts 3, 3, the pulleys 3a, 3a on which the pull-down belts 3, 3 are wound, and a servo motor (not illustrated) for conveying film by rotating the pulleys 3a, 3a in the directions of the arrows d, d (see FIG. 5).

Figure 4:
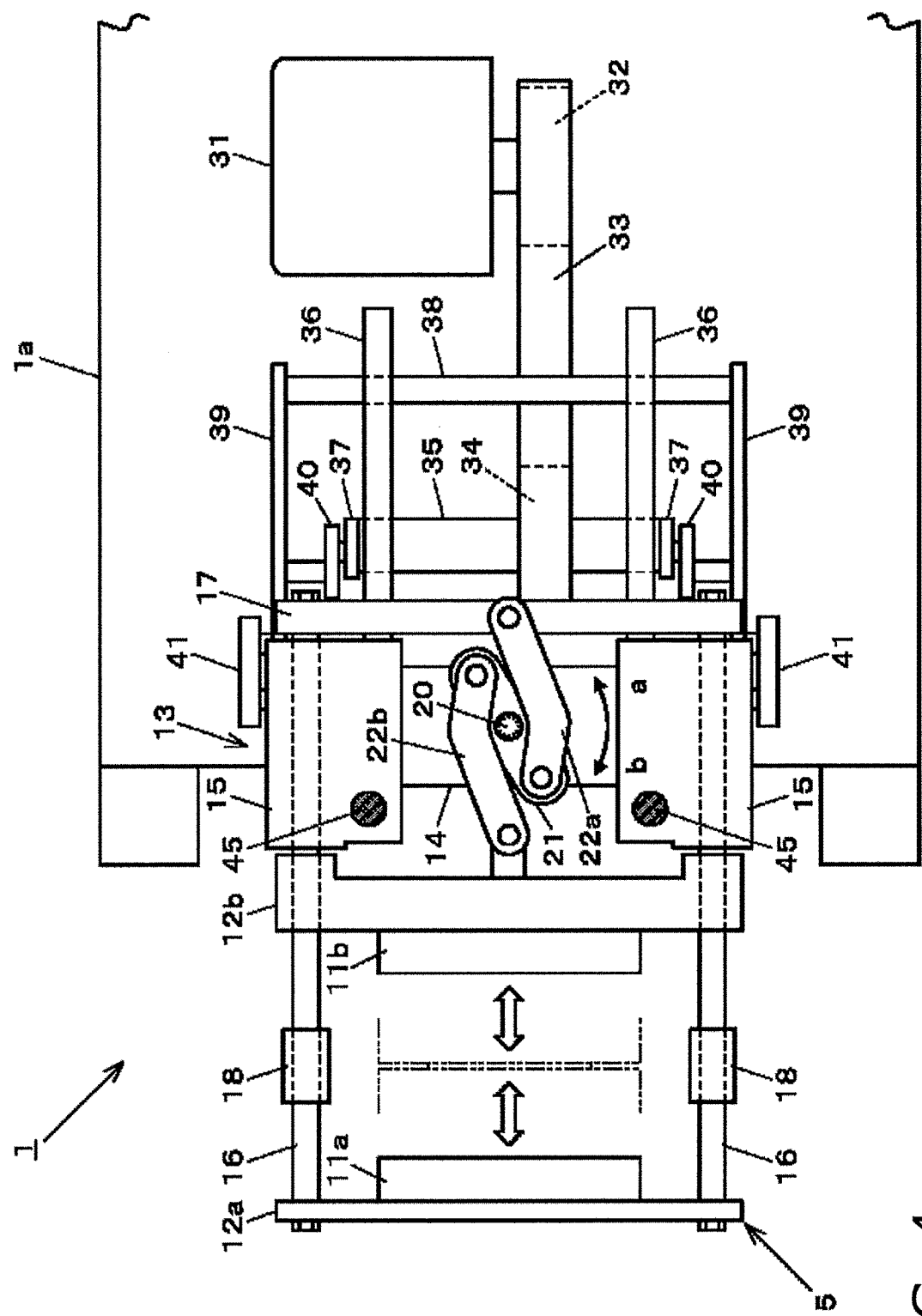
FIG. 4 is a perspective view along the line I-I of FIG. 3.

As shown in FIG. 4, the transverse sealing mechanism 5 is provided with one pair of front and back seal jaws 11a, 11b. The seal jaws 11a, 11b extend horizontally in the left and right, and are mounted to respective bases 12a, 12b. The bases 12a, 12b are supported by a support unit 13 at the front and back so as to be movable in the horizontal direction. For example, the cutter is housed in the rear side jaw base 12b.

The support unit 13 has one pair of left and right support blocks 15, 15 connected by a connection frame 14. A support rod 16 extending to the front and back is inserted in a slidable manner into each block 15. A front side jaw base 12a is hung across the front end parts of the support rods 16, 16, and a base 17 for connection is hung across the back end parts. Each of the support rods 16 is supported by an arm part 18 provided extending forward from the block 15 and is retained in a horizontal orientation. The rear side jaw base 12b is slidably fitted to the support rods 16, 16 between the arm parts 18, 18 and blocks 15, 15.

The seal jaws 11a, 11 b are moved in a reciprocating manner forward and backward by a crank mechanism. Namely, as shown in FIG. 5, a top end portion of a spline shaft 20 projects upward from the top surface of the connection frame 14, and a crank 21 is fitted onto the projecting end part of the spline shaft 20. As shown in FIG. 4, a link 22a for the front side jaw 11a is provided between one rotating end part of the crank 21 and the base 17 for connection, and a link 22b for the rear side jaw 11b is provided between the other rotating end part of the crank 21 and the rear side jaw base 12b.

As shown in FIG. 4, when the spline shaft 20 rotates in the direction of the arrow a from a state in which the seal jaws 11a, 11b are mutually separated, the crank 21 also rotates in an integrated manner in the same direction a, and the rotation thereof is converted to linear motion in the forward or backward direction by the links 22a, 22b. Of the links, the link 22a for the front side jaw pushes the base 17 for connection rearward, and through this, the entire frame structure configured by the base 17 for connection, the pair of left and right support rods 16, and the front side jaw base 12a is moved rearward, and the front side seal jaws 11a are moved horizontally in the rearward direction. The link 22b for the rear side jaw pushes the rear side jaw base 12b forward, and through this, the rear side seal jaws 11b are moved horizontally forward.

Figure 6:
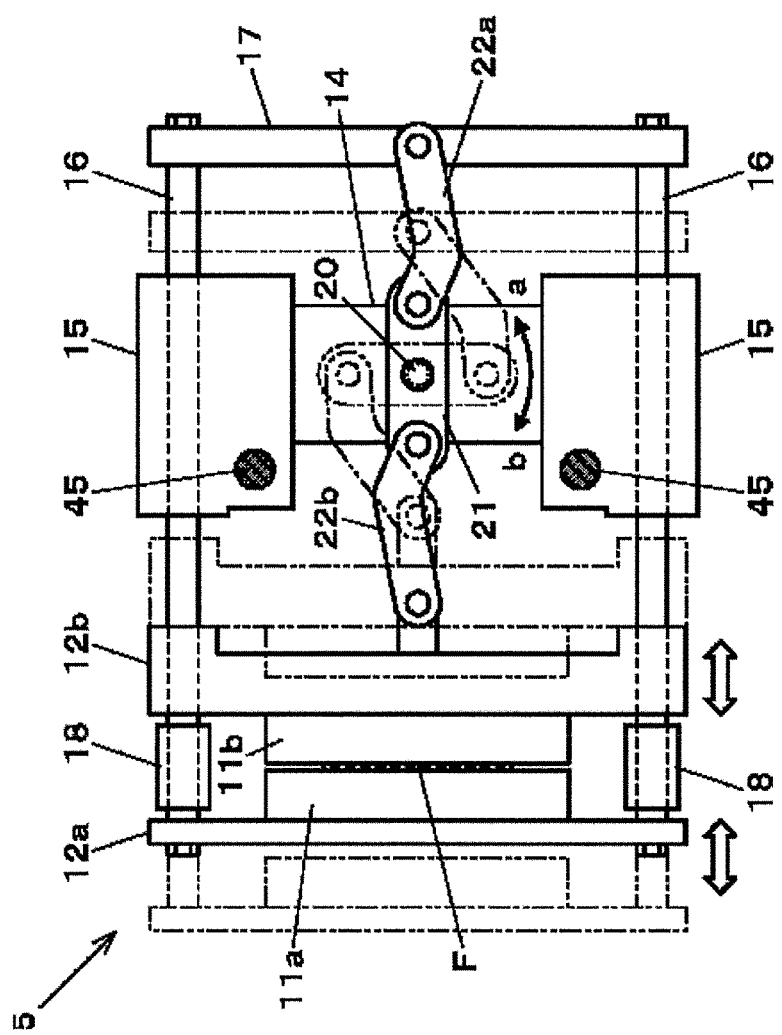
FIG. 6 is a plan view of the transverse sealing mechanism in a state in which the seal jaws are made to abut each other (are closed)

The distances from the rotational center of the crank 21 to the connection point of each of the links 22a, 22b are the same, and the shapes of the links 22a, 22b are also the same. Therefore, through rotation of the single spline shaft 20, the pair of front and back seal jaws 11a, 11b simultaneously moves the same distance in mutually opposite directions. As a result, as indicated by solid lines in FIG. 6, the seal jaws 11a, 11b are made to abut each other (i.e. close) with the cylindrical film F sandwiched therebetween. Moreover, while the seal jaws 11a, 11b are closed, the cylindrical film F is transversely sealed by heat and pressure.

When the spline shaft 20 is rotated from this state in the direction of the arrow b, the opposite action of that described above occurs; namely, the front side seal jaw 11a moves horizontally forward, and simultaneous therewith, the rear side seal jaw 11b moves horizontally rearward by the same distance. As a result, as shown in FIG. 4, the seal jaws 11a, 11b mutually separate (i.e. open).

With the form-fill-seal machine 1, a horizontal movement mechanism (indicated by the reference sign h) for horizontally moving (opening and closing) the seal jaws 11a, 11b is configured by the crank 21, the links 22a, 22b, etc. Furthermore, the support unit 13 supports this horizontal movement mechanism h and the seal jaws 11a, 11b.

As shown in FIG. 5, the spline shaft 20 is arranged upright, and vertically passes through the connection frame 14 of the support unit 13. A pair of top and bottom horizontal beams 42a, 42b is constructed at the front surface of the body 1a of the form-fill-seal machine 1, a bearing 27 is provided at an inner surface of the bottom beam 42b of the pair of beams, and a bottom part of the spline 20 is rotatably supported by the bearing 27.

As shown in FIG. 3, a timing pulley 26 is attached to the bottom end portion of the spline shaft 20, and a timing belt 25 is wound between the timing pulley 26 and a timing pulley 24 attached to an output shaft of a servo motor 23 for horizontal movement (for opening and closing the jaws). Namely, through the driving of the servo motor 23, the spline shaft 20 is rotated in the directions a and b to open and close the seal jaws 11a, 11b. The servo motor 23 is mounted to the packaging machine body 1a by a bracket (not illustrated) or the like.

With the form-fill-seal machine 1, a transverse movement means (indicated by reference sign H) for moving the pair of seal jaws 11a, 11b in the horizontal direction to cause the seal jaws to abut each other or separate is configured by the horizontal movement mechanism h and the servo motor 23.

As shown in FIG. 5, the top and bottom horizontal beams 42a, 42b are provided with a pair of left and right guide rods 45, 45 with mounting blocks 43, 43, 44, 44 interposed therebetween. Each of the guide rods 45 is arranged upright in parallel with the spline shaft 20, and vertically passes through the respective support blocks 15 of the support units 13. Through this, the support unit 13 is supported at three points by the two guide rods 45, 45 and the one spline shaft 20. Moreover, as shown in FIG. 4, these guide rods 45, 45 and the spline shaft 20 are positioned at vertices of a triangle from a plan view, and therefore the support unit 13 is stably supported on a plane.

Through the crank-link mechanism, the support unit 13 is moved vertically in a reciprocating manner along the rods 45, 45 and the shaft 20. Namely, as shown in FIG. 5, a pair of left and right vertical walls 36, 36 is arranged upright from the packaging machine body 1a. As shown in FIG. 4, a crankshaft 35 is rotatably hung between the vertical walls 36, 36. Crank arms 37, 37 are mounted to both ends of the crankshaft 35. As shown in FIG. 3, one end of an intermediate link 40 is coupled to a rotating end part of each of the crank arms 37. The other end of the intermediate link 40 is coupled to a swinging link 39 partway in the lengthwise direction.

As shown in FIG. 5, a shaft 38 for a swinging fulcrum is also rotatably hung between the vertical walls 36, 36. One end of each the swinging links 39, 39 is attached to respective ends of the shaft 38 for the swinging fulcrum. As shown in FIG. 3, the support blocks 15 of the support unit 13 are coupled through respective second intermediate links 41 to the swinging end part of each swinging link 39.

A servo motor 31 for vertical movement (for raising and lowering the jaws) is mounted on the packaging machine body 1a, and a timing belt 33 is wound between a timing pulley 32 attached to the output shaft of the servo motor 31, and a timing pulley 34 attached to the crankshaft 35. Namely, through driving of the servo motor 31, the crankshaft 35 rotates in a direction c, and the support unit 13 moves up and down. At this time, the intermediate links 40 move up and down by the rotation of the crank arms 37, thereby causing the swinging links 39 to swing up and down. As the swinging links 39 absorb torsion between the arcuate movement and linear movement with the second intermediate links 41, the overall support unit 13, as well as the transverse seal jaws 11a, 11b and the horizontal movement mechanism H etc. are moved vertically in a reciprocating manner.

Figure 7:
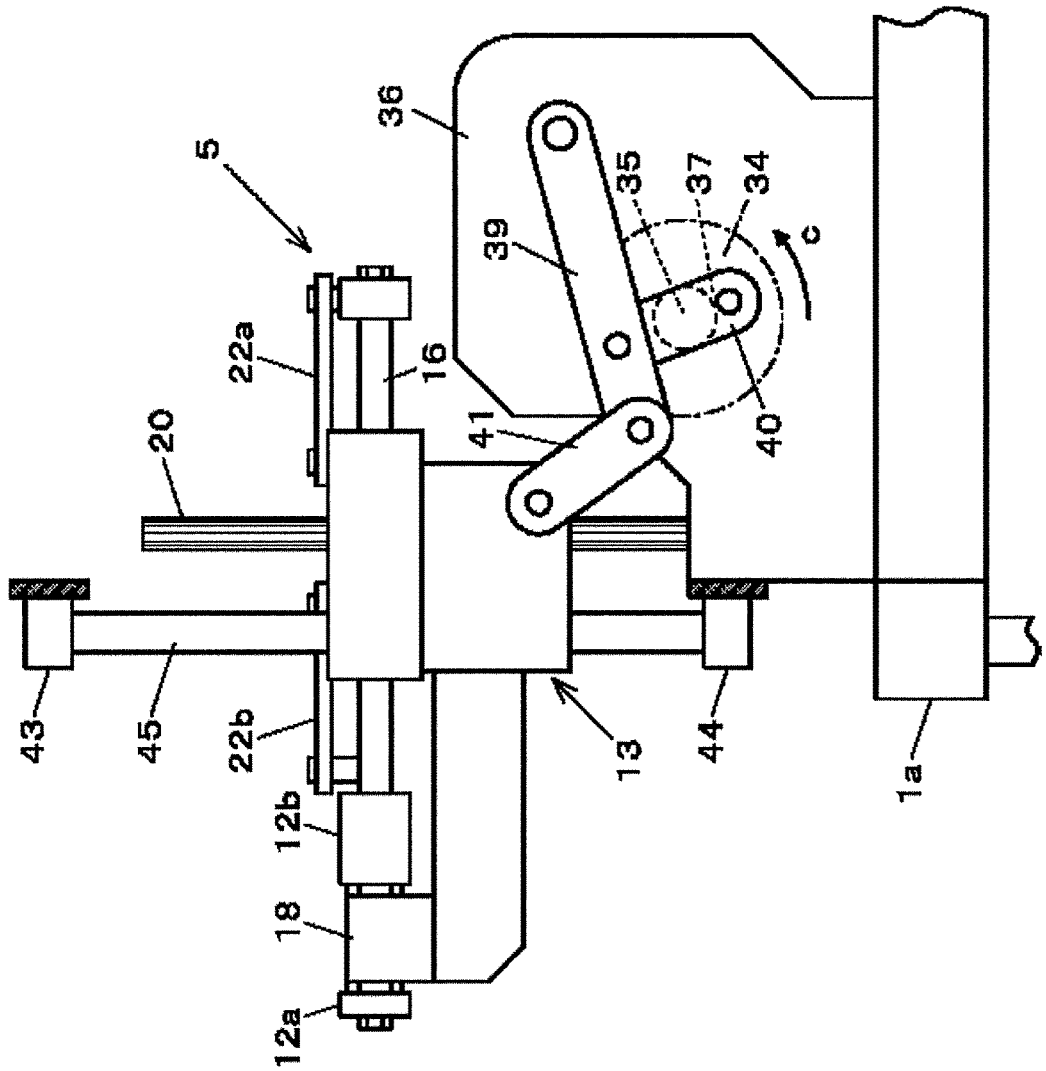
FIG. 7 is a right side view of the transverse sealing mechanism in a state in which the seal jaws are lowered to the bottom dead center.

FIG. 3 shows a state in which the support unit 13 is located at the top dead center, and FIG. 7 shows a state in which the unit is located at the bottom dead center. While not illustrated in detail, at the top dead center, the seal jaws 11a, 11b seem to be somewhat closed because, for example, transverse sealing will soon begin. At the bottom dead center, the seal jaws 11a, 11b seem to be somewhat opened because, for example, transverse sealing has already been completed.

With the form-fill-seal machine 1, a vertical movement mechanism (indicated by the reference sign v) for vertically moving (raising and lowering) the support unit 13 is configured by the crank arms 37 and the plurality of links 39 to 41, etc. Furthermore, a longitudinal movement means (indicated by the reference sign V) for moving the pair of seal jaws 11a, 11b in the longitudinal direction along the conveying direction of the cylindrical film F is configured by the vertical movement mechanism v and the servo motor 31.

Figure 8:
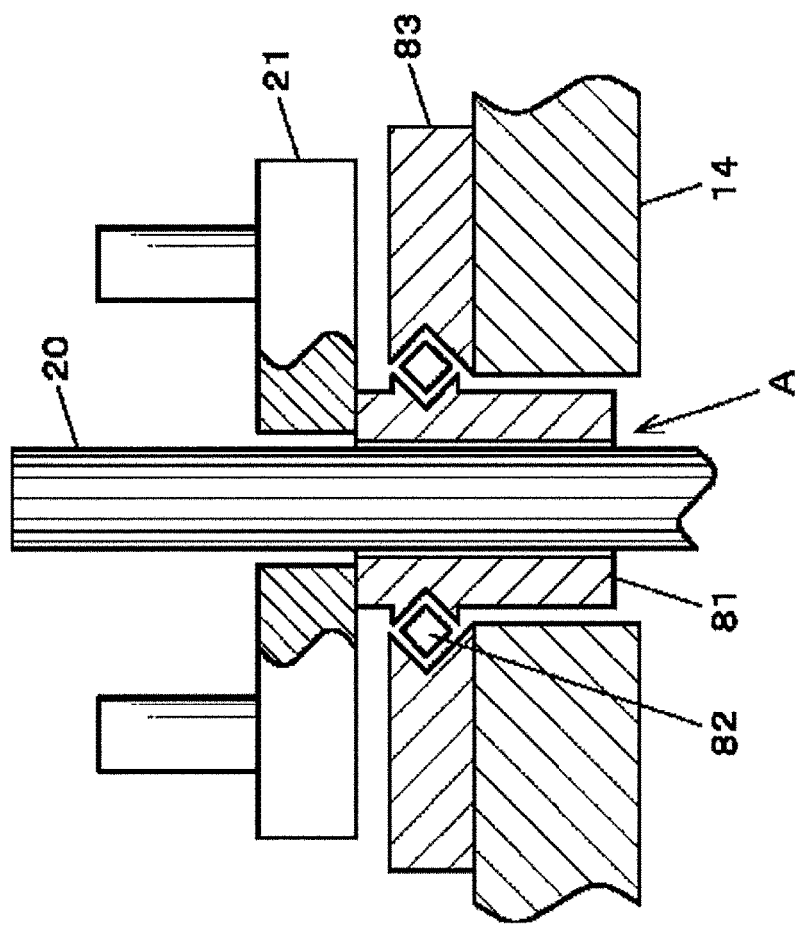
FIG. 8 is a simplified, enlarged vertical cross-sectional view showing an engagement section between a spline shaft and a support unit.

Note that a well-known ball spline is used in the engagement section (indicated by reference sign A in FIG. 5) between the spline shaft 20 and the connection frame 14 of the support unit 13. Namely, as shown in a somewhat greater degree of detail by FIG. 8, the crank 21 is directly connected to the ball spline 81, and participates in the rotation transmission of the spline shaft 20. A cross roller bearing 82 and an outer housing 83 are present between the spline shaft 20 and the connection frame 14, and the spline shaft 20 and the connection frame 14 are not in direct contact. In other words, the rotation of the spline shaft 20 is isolated. However, sliding is allowed solely for the vertical linear motion direction. Through this, the spline shaft 20 can transmit drive force to the horizontal movement mechanism h, and can guide the vertical movement of the support unit 13 without hindrance.

With the form-fill-seal machine 1, the seal jaws 11a, 11b are moved horizontally by the transverse movement means H such that the jaws are made to abut each other or separate (open or close), and are moved vertically along with the support unit 13 by the longitudinal movement means V. The seal jaws 11a, 11b are thereby capable of executing box motion including motion in shapes from quadrilateral to elliptical from a side view as shown by the paths indicated by reference signs S, S in FIG. 3. As will be described later, the actual paths of the seal jaws 11a, 11b in this embodiment are in a box motion, and differ from the paths S shown in FIG. 3.

With the form-fill-seal machine 1, in addition to the provision of the pair of guide rods 45, 45, for guiding movement of the support unit 13 in the vertical direction, the spline shaft 20, which was originally provided to drive the horizontal movement mechanism h, vertically passes through the support unit 13 in parallel with the pair of guide rods 45, 45 and also functions as a guide rod. Therefore, members can be made common, the number of components can be reduced, and the structure can be simplified without newly providing extra members, and the support unit 13 can be supported at 3 points and within a plane, the orientation of the support unit 13 can be stabilized and vertical movement thereof can be made smoother, and high speed movement in the vertical direction of the support unit 13 and the seal jaws 11a, 11b is ensured.

(2-4-2) Configuration of the Seal Jaws

Figure 9:
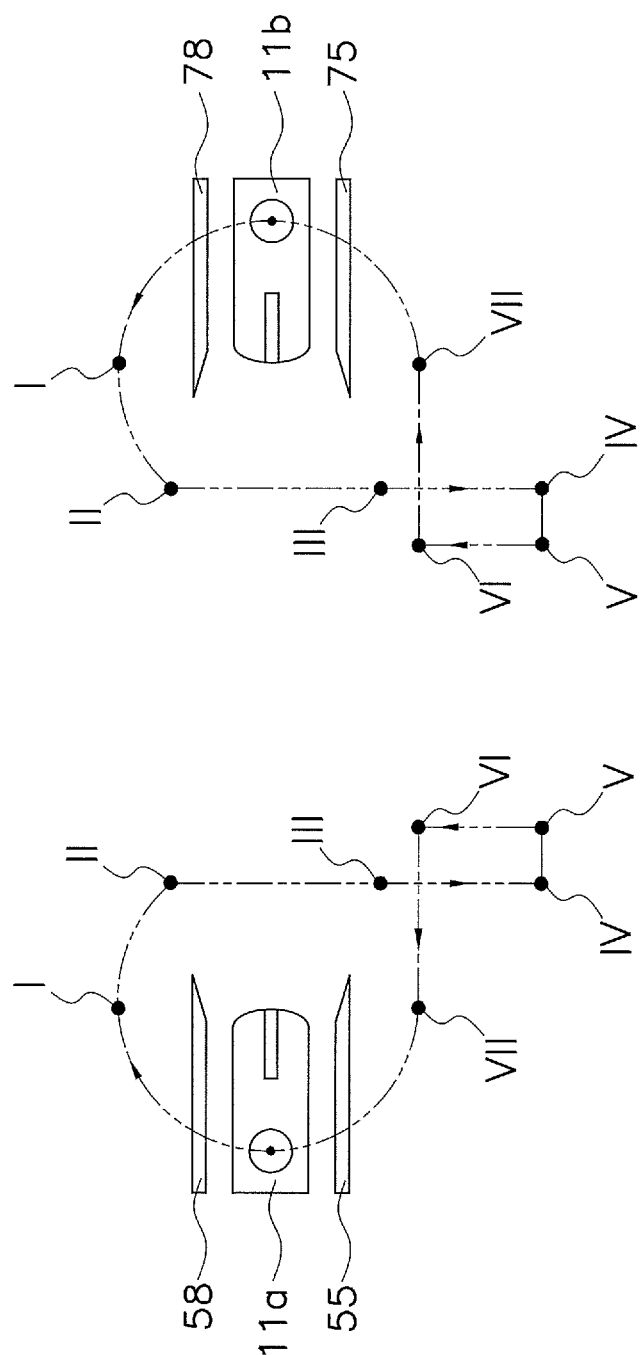
FIG. 9 is view showing paths of a pair of seal jaws for a case in which the transverse sealing mechanism is viewed from the right side.

Next, the paths of the seal jaws 11a, 11b of the present embodiment are described. Hereinafter, as necessary, the pair of seal jaws 11a, 11b is referred to respectively as a first seal jaw 11a and a second seal jaw 11b. FIG. 9 shows the paths of the first seal jaw 11a and the second seal jaw 11b for a case in which the transverse sealing mechanism 5 is viewed from the right side. In FIG. 9, the paths of reference points for the pair of seal jaws 11a, 11b are indicated by the dotted lines.

A first squeezing member 55 and a first shutter 58 are mounted to the first seal jaw 11a. A second squeezing member 75 and a second shutter 78 are mounted to the second seal jaw 11b. The control unit of the form-fill-seal machine 1 controls the transverse sealing mechanism 5 to adjust the positions of the seal jaws 11a, 11b, the squeezing members 55, 75 and the shutters 58, 78.

The squeezing members 55, 75 are arranged so as to extend along a direction perpendicular to the plane of the drawing that depicts FIG. 9 (left and right direction in FIG. 2). The squeezing members 55, 75 are plates made from an elastic material. The first squeezing member 55 and the second squeezing member 75 are respectively arranged below the first seal jaw 11a and the second seal jaws 11b. The pair of squeezing members 55, 75 can slide so as to mutually approach or separate along the front and back direction. That is, the spacing between the first squeezing member 55 and the second squeezing member 75 can be adjusted.

Just before the first seal jaw 11a and the second seal jaw 11b perform transverse sealing of the cylindrical film F, the first squeezing member 55 and the second squeezing member 75 respectively make contact with the cylindrical film F prior to contact being made by the first seal jaw 11a and the second seal jaw 11b. Furthermore, the first squeezing member 55 and the second squeezing member 75 move downward with a slight gap left at the inner side of the cylindrical film F. Through this, the squeezing members 55, 75 downwardly squeeze the cylindrical film F, and cause the package contents C adhering to the inner-side surface of the cylindrical film F to drop downward. As a result, there will be no instance of the seal jaws 11a, 11b biting into a foreign substance such as the package contents C at the portion of the cylindrical film F to be transversely sealed. Accordingly, the squeezing members 55, 75 can reduce the incidence of defective sealing caused by the seal jaws 11a, 11b.

The shutters 58, 78 are arranged so as to extend along the direction perpendicular to the plane of the drawing that depicts FIG. 9 (left and right direction in FIG. 2). The shutters 58, 78 are plates made from an elastic material. The first shutter 58 and the second shutter 78 are respectively arranged above the first seal jaw 11a and the second seal jaw 11b. The pair of shutters 58, 78 can slide so as to mutually approach or separate along the front and back direction. That is, the spacing between the first shutter 58 and the second shutter 78 can be adjusted. The pair of shutters 58, 78 is coupled to the pair of squeezing members 55, 75, and can slide in the forward or backward direction.

Just before the first seal jaw 11a and the second seal jaw 11b perform transverse sealing of the cylindrical film F, the first shutter 58 and the second shutter 78 respectively make contact with the cylindrical film F prior to contact being made by the first seal jaw 11a and the second seal jaw 11b, and sandwich the cylindrical film F with a slight gap left at the inner-side of the cylindrical film F. In this state, the package contents C supplied from the combination weighing unit 92 are charged into the cylindrical film F further above the portion sandwiched by the shutters 58, 78. After the seal jaws 11a, 11b sandwich the cylindrical film F and heat seal the film in the transverse direction, the shutters 58, 78 begin to separate from each other.

The shutters 58, 78 prevent the package contents C from dropping from above and into the cylindrical film F at the portion of the cylindrical film F to be transversely sealed. Through this, there will be no instance of the seal jaws 11a, 11b biting into a foreign substance such as the package contents C at the portion of the cylindrical film F to be transversely sealed. Therefore, the shutters 58, 78 can reduce the incidence of defective sealing caused by the seal jaws 11a, 11b.

(3) Action of the Form-Fill-Seal Machine (3-1) Overall Action

First, an overview of the action by which the form-fill-seal machine 1 fills the bags X with the package contents C is described. The film Fa supplied from the film supply unit 94 to the shaping mechanism 73 is wound about the tube 2 and shaped into cylinder, and is then conveyed downward by the pull-down belt mechanism 74. Both vertical direction-extending edge portions of the cylindrical film Fa wound about the tube 2 are overlapped. The overlapping portions of the cylindrically shaped film Fa are sealed in the longitudinal direction by the longitudinal sealing mechanism 4, forming the cylindrical film F.

The longitudinally sealed cylindrical film F is removed from the tube 2, and conveyed downward to the transverse sealing mechanism 5. At the transverse sealing mechanism 5, before the cylindrical film F is transversely sealed by the pair of seal jaws 11a, 11b, the pair of shutters 58, 78 and the pair of squeezing members 55, 75 mutually approach and sandwich the cylindrical film F. At this time, at the same time that the pair of shutters 58, 78 draws mutually closer and sandwiches the cylindrical film F, the pair of squeezing members 55, 75 also draws mutually closer and sandwiches the cylindrical film F. Immediately before being transversely sealed by the pair of seal jaws 11a, 11b, the cylindrical film F is present below the portion sandwiched by the pair of shutters 58, 78. In addition, the package contents C that were charged in the preceding cycle are present below the portion to be transversely sealed. At the same time that the pair of shutters 58, 78 and the pair of squeezing members 55, 75 sandwich the cylindrical film F, the film stops being conveyed.

Next, the cylindrical film F is squeezed downward by the pair of squeezing members 55, 57 sandwiching the cylindrical film F. Through this, package contents C adhering the inner surface of the cylindrical film F at the portion of the cylindrical film F to be transversely sealed drop downward.

Next, after the cylindrical film F is downwardly squeezed, the cylindrical film F is sandwiched and transversely sealed by the pair of seal jaws 11a, 11b. Through this transverse sealing action, a bag X in which the package contents C are sealed is formed below the pair of seal jaws 11a, 11b. This bag X is connected to the trailing cylindrical film F. As will be described later, while ascending, the transverse sealing mechanism 5 transversely seals the cylindrical film F through the pair of seal jaws 11a, 11b.

Next, while the cylindrical film F is being transversely sealed, package contents C weighed by the combination weighing unit 92 are dropped into the tube 2, and the package contents C are thereby charged into the cylindrical film F further above the portion that is being sandwiched by the shutters 58, 78.

Next, when transverse sealing by the seal jaws 11a, 11b has completed, the pair of shutter 58, 78 and the pair of squeezing members 55, 75 mutually separate. At this time, at the same time that the pair of shutters 58, 78 mutually separates, the pair of squeezing members 55, 75 also mutually separates.

Next, the transverse-sealed portion of the cylindrical film F is cut in the transverse direction by the cutter housed in the jaw base 12b at which the second seal jaw 11b is attached. Through this, the bag X in which the package contents C are sealed is cut and separated from the trailing cylindrical film F. After transverse sealing by the seal jaws 11a, 11b has completed, the seal jaws 11a, 11b mutually separate, and conveying of the cylindrical film F is resumed.

As described above, the bags X in which the package contents C are sealed are manufactured continuously. The manufactured bags X are then guided by a belt conveyor (not illustrated), and transferred to a device used in a subsequent step such as a thickness checker, a weight checker, etc.

(3-2) Detailed Action of the Transverse Sealing Mechanism

Next, the detailed action of the transverse sealing mechanism 5 of the form-fill-seal machine 1 is described while referring to FIGS. 10 to 16. FIGS. 10 to 16 show respective states, as viewed from the right side, of the transverse sealing mechanism 5 at points I to VII on the paths shown in FIG. 9. In order to facilitate an understanding of the action of the transverse sealing mechanism 5, only the pair of seal jaws 11a, 11b, the pair of squeezing members 55, 75, and the pair of shutters 58, 78 are shown as constituent elements of the transverse sealing mechanism 5 in FIGS. 10 to 16. By driving the transverse sealing mechanism 5 in the order shown by FIGS. 10 to 16, the top end portion of the bag X and the bottom end portion of the subsequent bag are simultaneously sealed. The pair of squeezing members 55, 75 and the pair of shutters 58, 78 open and close at the same timing.

Figure 16:
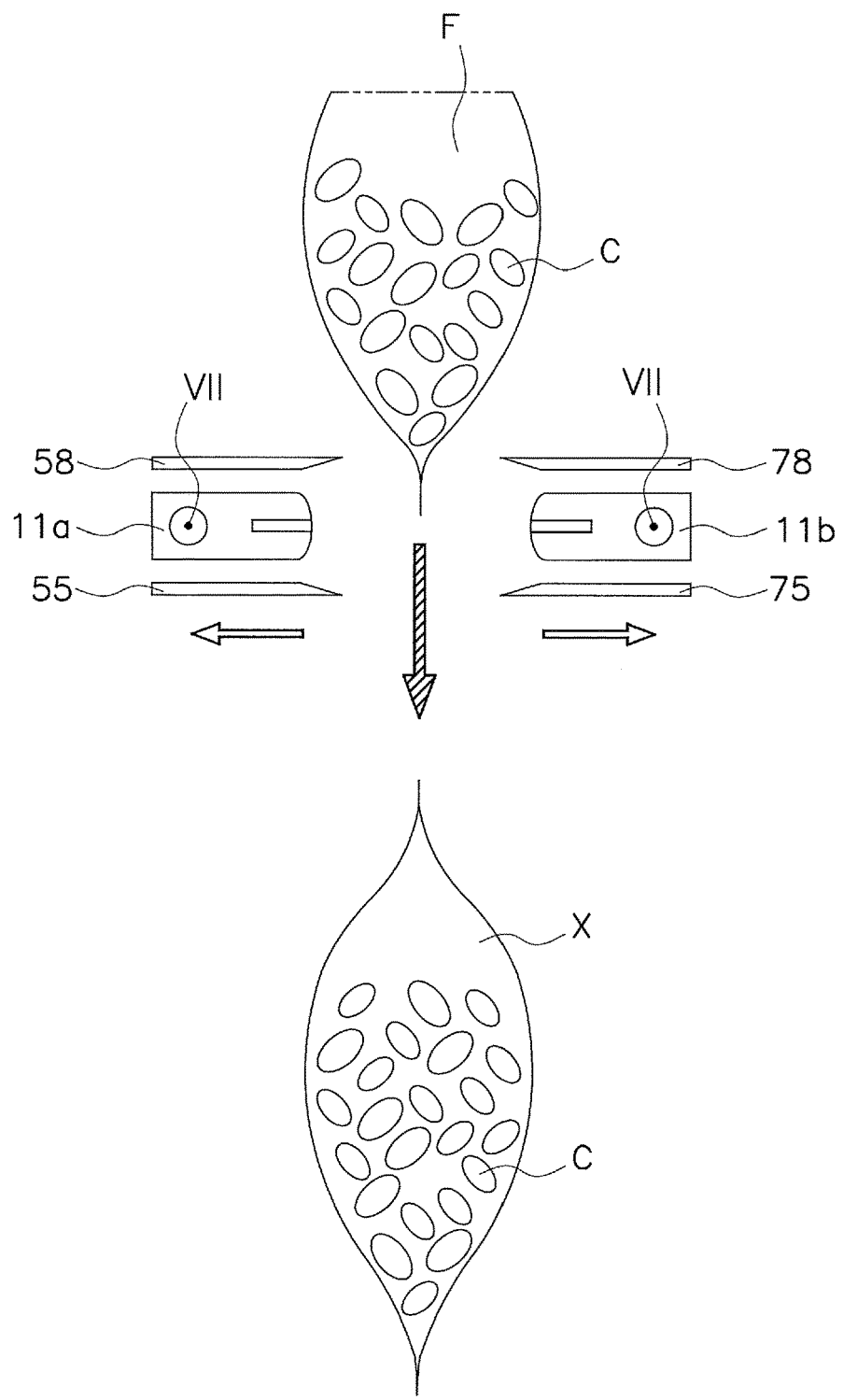
FIG. 16 is a view showing the state of the transverse sealing mechanism at point VII of FIG. 9.

The transverse sealing mechanism 5 drives the seal jaws 11a, 11b, the squeezing members 55, 75, and the shutters 58, 78. FIGS. 10 to 13 show states prior to the cylindrical film F being sealed, with the seal jaws 11a, 11b not abutting on the cylindrical film F. FIGS. 14 and 15 show states when the cylindrical film F is being transversely sealed, with the seal jaws 11a, 11b sandwiching the cylindrical film F. FIG. 16 shows a state after transverse sealing of the cylindrical film F has completed, with the seal jaws 11a, 11b separated from the cylindrical film F.

As shown in FIG. 9, the pair of the seal jaws 11a, 11b undergoes box motion in which a portion of the path is rectangular. More specifically, as shown in FIG. 9, the pair of seal jaws 11a, 11b mutually draws closer together from a state in which the jaws are mutually separated by the greatest distance, to a state in which the jaws are separated by a prescribed first distance (points I to II). Next, the pair of seal jaws 11a, 11b descends while maintaining the state of being mutually separated by the first distance (points II to IV). Next, the pair of seal jaws 11a, 11b stops descending, and the jaws once again draw closer together until separated by a prescribed second distance, and sandwich the cylindrical film F (points IV to V). Next, the pair of seal jaws 11a, 11b ascends while maintaining the state of being separated by the second distance (points V to VI). At this time, the pair of seal jaws 11a, 11b transversely seals the cylindrical film F while ascending. Next, after transverse sealing of the cylindrical film F is completed, the pair of seal jaws 11a, 11b mutually separates (point VI to VII), after which the pair of seal jaws 11a, 11b returns to the state shown in FIG. 10 (points VII to I). The box motion of the pair of seal jaws 11a, 11b is performed through gear shifting control of the servo motor 23 for horizontal movement and the servo motor 31 for vertical movement, and switching control between forward and reverse rotation of the servo motor 31 for vertical movement.

Figure 17:
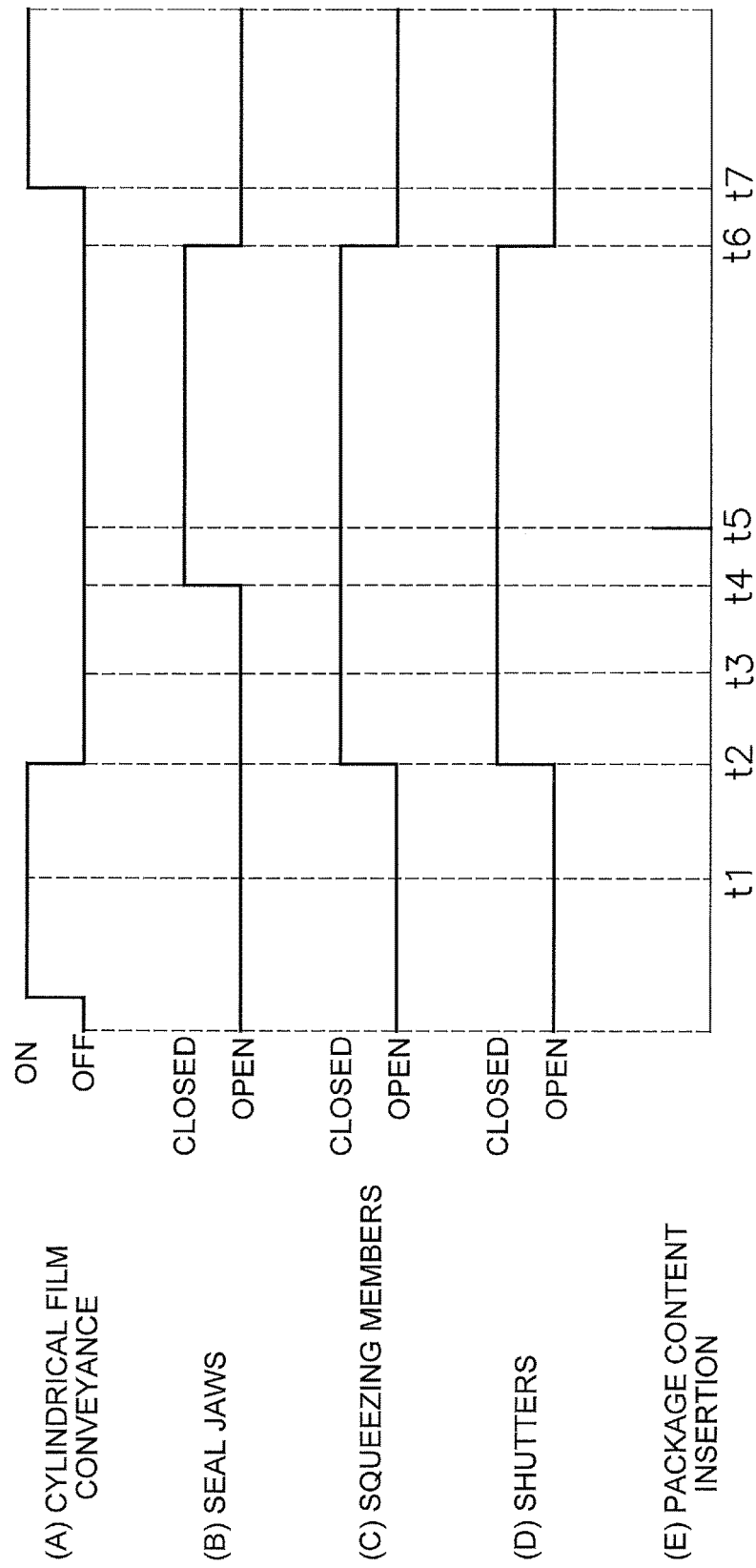
FIG. 17 is a timing chart of the transverse sealing action performed by the transverse sealing mechanism.

FIG. 17 is a timing chart for the transverse sealing action performed by the transverse sealing mechanism 5 shown in FIGS. 10 to 16. The plurality of timing charts shown in FIGS. 17(*a*) to (*e*) have a common time axis (horizontal axis). Times t1 to t7 on the common time axis indicated by the dashed lines in the vertical direction of FIG. 17 correspond respectively to the states of each of the points I to VII shown in FIG. 9 (states shown in FIGS. 10 to 16).

FIG. 17(*a*) is a chart showing the timing of the conveying of the cylindrical film F. In FIG. 17(*a*) "on" indicates a state in which the cylindrical film F is being conveyed, and "off" indicates a state in which conveying of the cylindrical film F is stopped.

FIG. 17(*b*) is a chart showing the timing at which the seal jaws 11a, 11b are opened and closed. In FIG. 17(*b*), "closed" indicates a state in which the seal jaws 11a, 11b are sandwiching the cylindrical film F, or a state in which the seal jaws 11a, 11b are moving from a state of being mutually separated by the first distance to a state of being mutually separated by the second distance (state of points IV to V in FIG. 9). In FIG. 17(*b*), "open" indicates a state in which the seal jaws 11a, 11b are not sandwiching the cylindrical film F.

FIG. 17(*c*) is a chart showing the timing at which the squeezing members 55, 75 are opened and closed. In FIG. 17(*c*), "closed" indicates a state in which the squeezing members 55, 75 are sandwiching the cylindrical film F, and "open" indicates a state in which the squeezing members 55, 75 are not sandwiching the cylindrical film F.

FIG. 17(*d*) is a chart showing the timing at which the shutters 58, 78 are opened and closed. In FIG. 17(*d*), "closed" indicates a state in which the shutters 58, 78 are sandwiching the cylindrical film F, and "open" indicates a state in which the shutters 58, 78 are not sandwiching the cylindrical film F.

FIG. 17(*e*) is a chart showing the timing at which the package contents C are charged. In FIG. 17(*e*), the time t5 at which the package contents C are charged is indicated by a bold line.

With the form-fill-seal machine 1, the pull-down belt mechanism 74 intermittently sends the film Fa. Therefore, as shown in FIG. 17, conveying of the cylindrical film F is not continuous, and stops for a prescribed amount of time at a prescribed cycle. More specifically, when the squeezing members 55, 75 begin to squeeze the cylindrical film F, conveying of the cylindrical film F is stopped. While conveying of the cylindrical film F is stopped, the seal jaws 11a, 11b transversely seal the cylindrical film F. Next, after transverse sealing of the cylindrical film F has completed, and the seal jaws 11a, 11b have separated from the cylindrical film F, conveying of the cylindrical film F is resumed.

Next, each of the states shown in FIGS. 10 to 16 is described. Points I to VII on the paths shown in FIG. 9 correspond respectively to the points I to VII included in the seal jaws 11a, 11b shown in FIGS. 10 to 16. In FIGS. 10 to 16, when the seal jaws 11a, 11b are moving, the direction of movement is indicated by white block arrows, and if the cylindrical film F is moving, the direction of movement is indicated by a diagonal line-hatched arrow.

FIG. 10 shows the state of the transverse sealing mechanism 5 at point I shown in FIG. 9 and at time t1 shown in FIG. 17. FIG. 10 shows a state immediately before the squeezing members 55, 75 begin to downwardly squeeze the cylindrical film F. Hereinafter, the position of the seal jaws 11a, 11b shown in FIG. 10 is called the reference position. At the reference position, the seal jaws 11a, 11b are at the highest position. At this time, the pair of squeezing members 55, 75 is separated from each other, the pair of seal jaws 11a, 11b is separated from each other, and the pair of shutters 58, 78 are separated from each other. After the state shown in FIG. 10, the pair of shutters 58, 78 draws mutually closer, and at the same time, the pair of squeezing members 55, 75 also draws mutually closer. Furthermore, at time t2, the pair of shutters 58, 78 and the pair of squeezing members 55, 75 contact the cylindrical film F, and thereby sandwich the cylindrical film F. At this time, the pair of seal jaws 11a, 11b also draws mutually closer from the state shown in FIG. 10.

Figure 11:
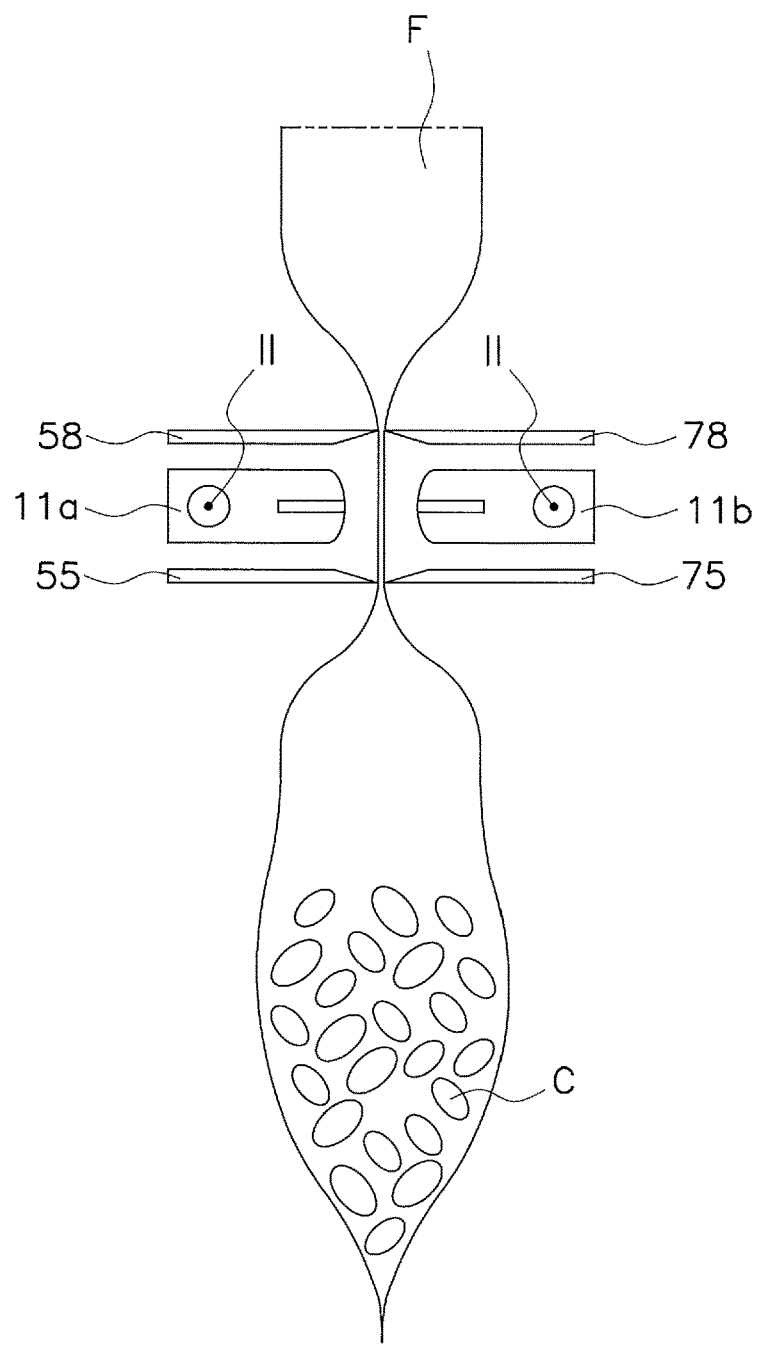
FIG. 11 is a view showing the state of the transverse sealing mechanism at point II of FIG. 9.

FIG. 11 shows the state of the transverse sealing mechanism 5 at point II shown in FIG. 9 and at time t2 shown in FIG. 17. FIG. 11 shows a state at the point in time at which the squeezing members 55, 75 begin to downwardly squeeze the cylindrical film F. At this time, the pair of seal jaws 11a, 11b is mutually separated by a prescribed distance (first distance). From this time onward, the pair of shutters 58, 78 and the pair of squeezing members 55, 75 are in a state of sandwiching the cylindrical film F until transverse sealing of the cylindrical film F has completed. Moreover, conveying of the cylindrical film F stops at time t2.

Figure 12:
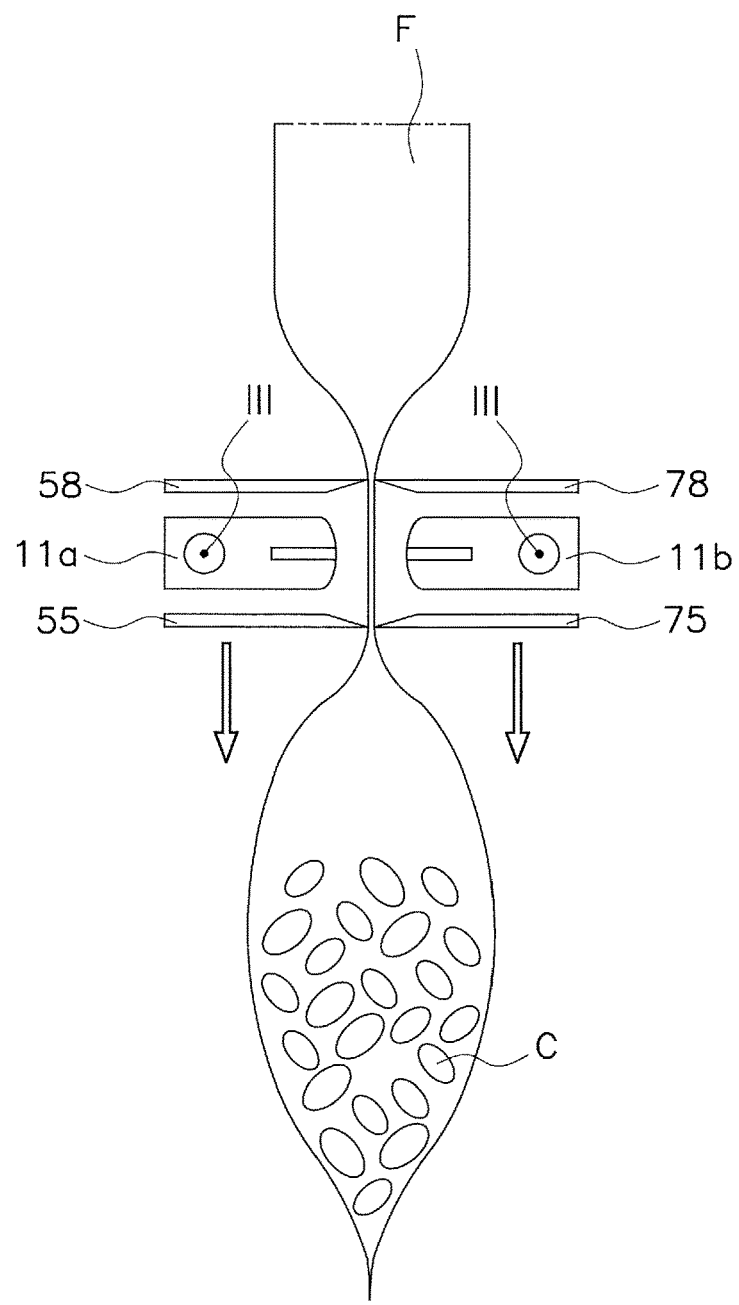
FIG. 12 is a view showing the state of the transverse sealing mechanism at point III of FIG. 9.

FIG. 12 shows the state of the transverse sealing mechanism 5 at point III shown in FIG. 9 and at time t3 shown in FIG. 17. FIG. 12 shows the state when the squeezing members 55, 75 are downwardly squeezing the cylindrical film F. At this time, the tip end parts of the squeezing members 55, 75 move downward. Through this, the cylindrical film F is downwardly squeezed by the squeezing members 55, 75.

FIG. 13 shows the state of the transverse sealing mechanism 5 at point IV shown in FIG. 9, and at time t4 shown in FIG. 17. FIG. 13 shows a state at the point in time at which the squeezing members 55, 75 stop moving downward, and finish squeezing the cylindrical film F. That is, the period during which the pair of squeezing members 55, 75 is squeezing the cylindrical film F is the period from time t2 to time t4. In addition, FIG. 13 shows a state at the point in time at which the pair of seal jaws 11a, 11b begins to sandwich and transversely seal the cylindrical film F.

FIG. 14 shows the state of the transverse sealing mechanism 5 at point V shown in FIG. 9, and at time t5 shown in FIG. 17. FIG. 14 shows a state in which the pair of seal jaws 11a, 11b is sandwiching and transversely sealing the cylindrical film F. At this time, the pair of seal jaws 11a, 11b is contacting the cylindrical film F. The pair of squeezing members 55, 75 and the pair of shutters 58, 78 are still sandwiching the cylindrical film F. At time t5, the package contents C weighed by the combination weighing unit 92 are supplied from above.

FIG. 15 shows the state of the transverse sealing mechanism 5 at point VI shown in FIG. 9, and at time t6 shown in FIG. 17. FIG. 15 shows a state at a point in time where, after having moved upward while transverse sealing the cylindrical film F, the pair of seal jaws 11a, 11b has stopped moving and transverse sealing is completed. That is, the period during which the pair of seal jaws 11, 11b is transverse sealing the cylindrical film F is the period from time t4 to time t6. Conveying of the cylindrical film F has already stopped, and the seal jaws 11a, 11b sandwiching the cylindrical film F have ascended; therefore, the cylindrical film F further above the seal jaws 11a, 11b is raised. As a result, as shown in FIG. 15, the cylindrical film F further above the transverse-sealed portion expands in the horizontal direction. Note that switching between the ascending and descending of the seal jaws 11a, 11b is performed by switching the servo motor 31 for vertical movement between forward and reverse rotation. Moreover, at time t6, the pair of squeezing members 55, 75 begins to mutually separate, and the pair of shutters 58, 78 also begins to mutually separate.

FIG. 16 shows the state of the transverse sealing mechanism 5 at point VII shown in FIG. 9, and at time t7 shown in FIG. 17. FIG. 16 shows a state in which the seal jaws 11a, 11b are mutually separated after transverse sealing of the cylindrical film F has been completed. Thereafter, the seal jaws 11a, 11b return from the state shown in FIG. 16 to the reference position shown in FIG. 10. At this time, the squeezing members 55, 75 and the shutters 58, 78 also return to their original positions along with the seal jaws 11a, 11b. Also, conveying of the cylindrical film F is resumed at time t7.

With the form-fill-seal machine 1, the cylindrical film F is transverse sealed by applying a prescribed amount of heat and pressure to the cylindrical film F from the seal jaws 11a, 11b by adjusting the outputs of the servo motor 23 for horizontal movement and the servo motor 31 for vertical movement. Through this, as shown in FIG. 15, a bag X having the package contents C stored within is formed by the seal jaws 11a, 11b below the transverse-sealed portion in a state of being coupled to the trailing cylindrical film F. After transverse sealing has been completed, the transverse-sealed portion of the cylindrical film F is cut in the transverse direction by the cutter housed in the jaw base 12b. In so doing, as shown in FIG. 16, the bag X is cut and separated from the trailing cylindrical film F.

(4) Characteristics (4-1)

The form-fill-seal machine 1 transverse seals the cylindrical film F through the pair of seal jaws 11a, 11b of the transverse sealing mechanism 5 while causing the seal jaws 11a, 11b to ascend in a state in which conveying of the cylindrical film F is stopped. In so doing, the seal jaws 11a, 11b approach the reference position while the cylindrical film F is being transverse sealed. That is, while the seal jaws 11a, 11b are transverse sealing, the seal jaws 11a, 11b move from point V to point VI on the paths shown in FIG. 9, and can draw closer to point I, which is the reference position.

Therefore, by causing the seal jaws 11a, 11b to ascend during the transverse sealing, the time required for the seal jaws 11a, 11b to return to the reference position from the position at which transverse sealing is completed (point VI in FIG. 9) is shortened. With a conventional form-fill-seal machine, the cylindrical film is transverse sealed by seal jaws while being conveyed downward. Therefore, with the conventional form-fill-seal machine, the time required to return the seal jaws to the original position (position at which the next transverse sealing can be started) after transverse sealing has been completed is longer than that of the form-fill-seal machine 1 of the present embodiment.

Therefore, the form-fill-seal machine 1 can transversely seal the cylindrical film F in an efficient manner by shortening the time from when the transverse sealing mechanism 5 completes the transverse sealing of the cylindrical film F until the transverse sealing mechanism 5 begins the next transverse sealing.

(4-2)

While the seal jaws 11a, 11b are transverse sealing the cylindrical film F, the form-fill-seal machine 1 causes the seal jaws 11a, 11b to ascend. In so doing, as shown in FIG. 15, the cylindrical film F located further above than the seal jaws 11a, 11b is lifted by the seal jaws 11a, 11b, and is thereby caused to expand in the horizontal direction. Therefore, the volume of the space in the cylindrical film F located further above than the seal jaws 11a, 11b increases, and thus the package contents C can be efficiently inserted into the cylindrical film F. Moreover, further above the seal jaws 11a, 11b, the maximum height position of the package contents C accommodated in the cylindrical film F is lowered, and therefore there will be no instance of the seal jaws 11a, 11b biting into the package contents C the next time transverse sealing is performed. Accordingly, the form-fill-seal machine 1 can reduce the incidence of defective sealing caused by the seal jaws 11a, 11b.

(4-3)

With the form-fill-seal machine 1, while the squeezing members 55, 75 are squeezing the cylindrical film F, the seal jaws 11a, 11b descend. Thereafter, while transverse sealing the cylindrical film F, the seal jaws 11a, 11b ascend. Thus, the form-fill-seal machine 1 raises and lowers the seal jaws 11a, 11b as necessary. The form-fill-seal machine 1 can easily switch between raising and lowering the seal jaws 11a, 11b by appropriately switching between forward and reverse rotation of the servo motor 31 for vertical movement of the transverse sealing mechanism 5.

(4-4)

The form-fill-seal machine 1 stops conveying of the cylindrical film F while the seal jaws 11a, 11b are transverse sealing the cylindrical film F. Therefore, the form-fill-seal machine 1 can stably print a label or the like onto the cylindrical film F while conveying of the cylindrical film F is stopped. Accordingly, the form-fill-seal machine 1 can suppress problems when printing onto the cylindrical film F.

(4-5)

With the form-fill-seal machine 1, the squeezing members 55, 75 can forcibly cause the package contents C inside the cylindrical film F to drop. Therefore, the form-fill-seal machine 1 can avoid the incidence of the seal jaws 11a, 11b biting into a foreign substance such as the package contents C at the portion of the cylindrical film F to be transversely sealed. Accordingly, the form-fill-seal machine 1 can reduce the incidence of defective sealing caused by the seal jaws 11a, 11b.

(5) Modifications

Various modifications are possible within a scope that does not depart from the spirit of the invention.

(5-1) Modification A

The form-fill-seal machine 1 of the present embodiment may be further provided with a gas blowing mechanism. The gas blowing mechanism blows gas into the cylindrical film F to be transversely sealed by the transverse sealing mechanism 5. The gas blowing mechanism is, for example, a member that can cause a gas to flow downward from above and into the tube 2 of the shaping mechanism 73. The gas blowing mechanism increases the amount of gas inside the cylindrical film F by blowing gas into the cylindrical film F, and can thereby cause the cylindrical film F to expand. That is, the gas blowing mechanism can adjust the thickness of the bag X shaped from the cylindrical film F.

FIG. 18 is a perspective view showing a simplified configuration of the form-fill-seal unit 93 according to the present modification. In FIG. 18, a gas jet tube 13c is inserted into the tube 2 from a top end opening of the tube 2. The gas jet tube 13c blows a gas such as air downward and into the tube 2. The gas blown from the gas jet tube 13c is sent into the cylindrical film F, and causes the cylindrical film F further above the portion transverse sealed by the seal jaws 11a, 11b to expand in the horizontal direction. In so doing, the package contents C are efficiently accommodated in the cylindrical film F further above the seal jaws 11a, 11b. Moreover, in so doing, the position of the maximum height of the contents C accommodated in the cylindrical film F is lowered, and therefore, there will be no instance of the seal jaws 11a, 11b biting into the package contents C when the next transverse sealing is performed. Accordingly, the form-fill-seal machine 1 can reduce the incidence of defective sealing caused by the seal jaws 11a, 11b by blowing gas into the cylindrical film F by the gas jet tube 13c.

Figure 19:
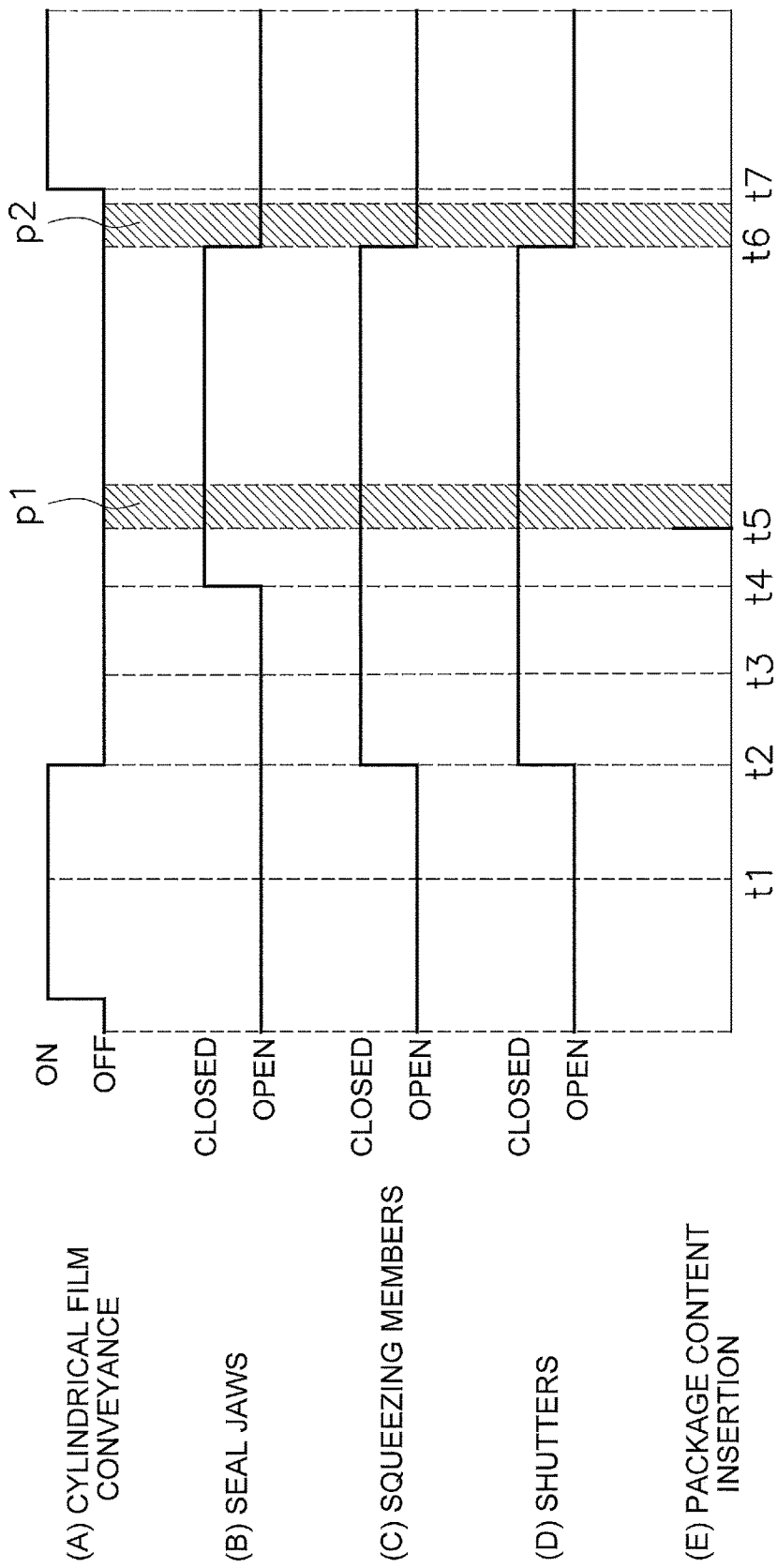
FIG. 19 is a timing chart of the transverse sealing action by the transverse sealing mechanism in the Modification A.

FIG. 19 is a timing chart relating to the action of the form-fill-seal unit 93 of the present modification. The timing charts of FIG. 19(a) to (e) are similar to those of FIG. 17. FIG. 19 shows, as diagonal line-hatched areas, time bands p1, p2 during which the gas jet tube 13c blows gas. During these time bands p1, p2, the gas jet tube 13c blows gas into the cylindrical film F. More specifically, the gas jet tube 13c begins to blow gas at the time t5 when the package contents C are supplied from above, and stops blowing gas at a desired time before the time t6 when the ascension of the seal jaws 54, 74 ends. Moreover, the gas jet tube 13c begins blowing gas at the time t6 when the ascension of the seal jaws 54, 74 ends, and stops blowing gas at a desired time before the time t7 when the seal jaws 54, 74 separate from the cylindrical film Fc, and conveying of the cylindrical film Fc is resumed.

The form-fill-seal machine of the present modification controls the amount of gas that is blown into the cylindrical film F from the gas jet tube 13c, thereby controlling the amount of gas that is sealed in the bag X, and enabling the thickness of the bag X to be appropriately adjusted.

(5-2) Modification B

The form-fill-seal machine 1 of the present embodiment may be connected to a thickness measurement mechanism for measuring the thickness of the bags X after being manufactured. In a form-fill-seal system that includes the form-fill-seal machine 1 and the thickness measurement mechanism, the thickness of the bags X manufactured by the form-fill-seal machine 1 is measured by the thickness measurement mechanism.

Moreover, the control unit of the form-fill-seal machine 1 may adjust the amount of gas blown into the cylindrical film F by the gas blowing mechanism provided for the form-fillseal machine 1 of Modification A, in accordance with the measured thickness of the bags X.

For example, in cases in which the thickness of the bags X measured by the thickness measurement mechanism is greater than a prescribed reference value, the control unit of the form-fill-seal machine 1 may automatically carry out control to reduce the amount of gas that is blown into the cylindrical film F by the gas blowing mechanism in order to reduce the thickness of the manufactured bags X. Conversely, in cases in which the thickness of the bags X measured by the thickness measurement mechanism is less than a prescribed reference value, the control unit of the form-fill-seal machine 1 may automatically carry out control to increase the amount of gas that is blown into the cylindrical film F by the gas blowing mechanism in order to increase the thickness of the manufactured bags X.

The invention claimed is:

1. A form-fill-seal machine for filling a bag with package contents while sealing a tube-shaped packaging material to form the bag, wherein the form-fill-seal machine comprises:
   a conveyance unit for conveying the packaging material downward;
   a transverse sealing unit having: first members for sandwiching the packaging material and sealing the packaging material in a transverse direction; and second members for sandwiching the packaging material while leaving a prescribed spacing; and
   a control unit for controlling a position of the transverse sealing unit;
   the control unit performing:
      a first control step to cause the transverse sealing unit located at a reference position to descend faster than the packaging material being conveyed downward by the conveyance unit, while the packaging material is sandwiched by the second members;
      a second control step to cause, after the first control step, the transverse sealing unit to ascend while the packaging material is being sealed by the first members; and
      a third control step to cause, after the second control step, the transverse sealing unit to move such that the first members are separated from the packaging material, and afterwards, returning the transverse sealing unit to the reference position.

2. The form-fill-seal machine according to claim 1, wherein in the second control step, the control unit causes gas to be blown into the bag from a moment that the transverse sealing unit begins to ascend until ascending of the transverse sealing unit is concluded.

3. The form-fill-seal machine according to claim 1, wherein in the third control step, the control unit causes gas to be blown into the bag from a moment that ascending of the transverse sealing unit is concluded until the first members separate from the packaging material.

4. The form-fill-seal machine according to claim 1, wherein the control unit controls the position of the transverse sealing unit by switching between forward and reverse rotation of a motor for causing the transverse sealing unit to move.

5. The form-fill-seal machine according to claim 1, wherein in the second control step, the control unit causes the conveyance unit to stop conveying the packaging material while the first members are sealing the packaging material.

6. The form-fill-seal machine according to claim 1, wherein in the first control step, the control unit causes the packaging material to be squeezed by the second members.

* * * * *